(12) United States Patent
Jaegle et al.

(10) Patent No.: US 12,462,163 B2
(45) Date of Patent: Nov. 4, 2025

(54) GENERATING NEURAL NETWORK OUTPUTS BY ENRICHING LATENT EMBEDDINGS USING SELF-ATTENTION AND CROSS-ATTENTION OPERATIONS

(71) Applicant: DeepMind Technologies Limited, London (GB)

(72) Inventors: Andrew Coulter Jaegle, London (GB); Joao Carreira, St. Albans (GB)

(73) Assignee: GDM Holding LLC, Mountain View, CA (US)

(*) Notice: Subject to any disclaimer, the term of this patent is extended or adjusted under 35 U.S.C. 154(b) by 15 days.

(21) Appl. No.: 18/095,925

(22) Filed: Jan. 11, 2023

(65) Prior Publication Data

US 2023/0145129 A1 May 11, 2023

Related U.S. Application Data

(63) Continuation of application No. PCT/EP2022/052569, filed on Feb. 3, 2022.
(Continued)

(51) Int. Cl.
*G06N 3/092* (2023.01)
*G06N 3/0475* (2023.01)
*G06N 3/084* (2023.01)

(52) U.S. Cl.
CPC .......... *G06N 3/092* (2023.01); *G06N 3/0475* (2023.01); *G06N 3/084* (2013.01)

(58) Field of Classification Search
CPC ...... G06N 3/092; G06N 3/0475; G06N 3/084; G06N 3/045; G06N 20/00
See application file for complete search history.

(56) References Cited

U.S. PATENT DOCUMENTS

2021/0319420 A1* 10/2021 Yu ..................... G06V 20/52

FOREIGN PATENT DOCUMENTS

CN 110192206 A 8/2019
CN 110612538 A 12/2019
(Continued)

OTHER PUBLICATIONS

Press et al., "Improving Transformer Models by Reordering their Sublayers", 2020, arXiv, v2, pp. 1-10 (Year: 2020).*
(Continued)

*Primary Examiner* — Leonard A Sieger
(74) *Attorney, Agent, or Firm* — Fish & Richardson P.C.

(57) ABSTRACT

This specification describes a method for using a neural network to generate a network output that characterizes an entity. The method includes: obtaining a representation of the entity as a set of data element embeddings, obtaining a set of latent embeddings, and processing: (i) the set of data element embeddings, and (ii) the set of latent embeddings, using the neural network to generate the network output characterizing the entity. The neural network includes: (i) one or more cross-attention blocks, (ii) one or more self-attention blocks, and (iii) an output block. Each cross-attention block updates each latent embedding using attention over some or all of the data element embeddings. Each self-attention block updates each latent embedding using attention over the set of latent embeddings. The output block processes one or more latent embeddings to generate the network output that characterizes the entity.

20 Claims, 11 Drawing Sheets

Related U.S. Application Data

(60) Provisional application No. 63/146,161, filed on Feb. 5, 2021.

(56) References Cited

FOREIGN PATENT DOCUMENTS

| CN | 112149459 A | 12/2020 |
|---|---|---|
| JP | 2020506466 A | 2/2020 |

OTHER PUBLICATIONS

Zhang et al., "A Simple Yet Effective Method for Video Temporal Grounding with Cross-Modality Attention", 2020, arXiv, v1, pp. 1-9 (Year: 2020).*
Li et al., "Deep Reinforcement Learning: An Overview", 2018, arXiv, v6, pp. 1-85 (Year: 2018).*
Rahman et al., "Integrating Multimodal Information in Large Pretrained Transformers", 2020, arXiv, v3, pp. 1-11 (Year: 2020).*
Yang et al., "MTGAT: Multimodal Temporal Graph Attention Networks for Unaligned Human Multimodal Language Sequences", 2020, arXiv, v1, pp. 1-12 (Year: 2020).*
Wang et al., "Friendly Topic Assistant for Transformer Based Abstractive Summarization", 2020, Proceedings of the 2020 Conference on Empirical Methods in Natural Language Processing, vol. 2020, pp. 485-497 (Year: 2020).*
Indurthi et al., "Look Harder: A Neural Machine Translation Model with Hard Attention", 2019, Proceedings of the 57th Annual Meeting of the Association for Computational Linguistics, vol. 57, pp. 3037-3043 (Year: 2019).*
Ji et al., "CASNet: A Cross-Attention Siamese Network for Video Salient Object Detection", Jul. 21, 2020, IEEE Transactions on Neural Networks and Learning Systems, vol. 32 No. 6, pp. 2676-2690 (Year: 2020).*
Carion et al., "End-to-End Object Detection with Transformers", 2020, arXiv, v3, pp. 1-26 (Year: 2020).*
Geng et al., "How Does Selective Mechanism Improve Self-Attention Networks?", 2020, arXiv, v1, pp. 1-10 (Year: 2020).*
International Preliminary Report on Patentability in International Appln. No. PCT/EP2022/052569, dated Aug. 17, 2023, 13 pages.
Office Action in Australian Appln. No. 2022216431, dated Apr. 9, 2024, 4 pages.
Adelson et al., "Spatiotemporal energy models for the perception of motion," Journal of the Optical Society of America A, Feb. 1985, 2(2):284-299.
Alayrac et al., "Self-supervised multimodal versatile networks," Advances in Neural Information Processing Systems 33 (NeurIPS 2020), 2020, 13 pages.
Arandjelovic et al., "Objects that sound," Proceedings of the European Conference on Computer Vision (ECCV), 2018, pp. 435-451.
Ba et al., "Layer normalization," CoRR, Jul. 21, 2016, arXiv:1607.06450, 14 pages.
Bahdanau et al., "Neural machine translation by jointly learning to align and translate," CoRR, Sep. 1, 2014, arxiv.org/abs/1409.0473, 15 pages.
Bello et al., "Attention augmented convolutional networks," Proceedings of the IEEE/CVF International Conference on Computer Vision (ICCV), 2019, pp. 3286-3295.
Beltagy et al., "Long former: The long-document Transformer," CoRR, Apr. 10, 2020, arXiv:2004.05150, 17 pages.
Borenstein et al., "Combining top-down and bottom-up segmentation," IEEE Transactions on Pattern Analysis and Machine Intelligence, Dec. 2008, 30(12):2109-2125.
Brock et al., "High performance large-scale image recognition without nor malization," Proceedings of the 38th International Conference on Machine Learning, 2021, 139:1059-1071.
Bronstein et al., "Geometric deep learning: Going beyond Euclidean data," IEEE Signal Processing Magazine, Jul. 2017, 34(4):18-42.
Carion et al., "End-to-end object detection with Transformers," Proceedings of European Conference on Computer Vision (ECCV), 2020, pp. 213-229.
Carreira et al., "Human pose estimation with iterative error feedback," Proceedings of IEEE Conference on Computer Vision and Pattern Recognition (CVPR), 2016, pp. 4733-4742.
Chen et al., "Generative pretraining from pixels," Proceedings of the 37th International Conference on Machine Learning, 2020, 119:1691-1703.
Chen et al., "UNITER: Learning Universal Image-TExt Representations," Proceedings of European Conference on Computer Vision (ECCV), 2020, 14 pages.
Child et al., "Generating long sequences with sparse Transformers," CoRR, Apr. 23, 2019, arXiv:1904.10509, 10 pages.
Choromanski et al., "Rethinking attention with Performers," Proceedings of International Conference on Learning Representations (ICLR), Sep. 28, 2020, 38 pages.
Cires et al., "High-performance neural networks for visual object classification," Technical Report No. IDSIA-01-11, Jan. 2011, 12 pages.
Cohen et al., "Group equivariant convolutional networks," Proceedings of The 33rd International Conference on Machine Learning, 2016, 48:2990-2999.
Cordonnier et al., "On the relationship between self-attention and convolutional layers," Proceedings of International Conference on Learning Representations (ICLR), Sep. 25, 2019, 18 pages.
Correia et al., "Adaptively sparse Transformers," Conference on Empirical Methods in Natural Language Processing, Nov. 3-7, 2019, pp. 2174-2184.
Cubuk et al., "Randaugment: Practical automated data augmentation with a reduced search space," Proceedings of IEEE Conference on Computer Vision and Pattern Recognition Workshops (CVPR), 2020, pp. 702-703.
Dai et al., "Transformer-XL: Attentive language models beyond a fixed-length context," Annual Meetings of the Association for Computational Linguistics, Jul. 2019, P19-1285:2978-2988.
Dehghani et al., "Universal Transformers," Proceedings of International Conference on Learning Representations (ICLR), 2019, 23 pages.
Deng et al., "ImageNet: A large-scale hierarchical image database," Proceedings of IEEE Conference on Computer Vision and Pattern Recognition (CVPR), Jun. 20-25, 2009, 8 pages.
Devlin et al., "BERT: Pre-training of deep bidirectional Transformers for language understanding," Proceedings of NAACL-HLT, Jun. 2-7, 2019 pp. 4171-4186.
Dosovitskiy et al., "An image is worth 16x16 words: Transformers for image recognition at scale," Proceedings of International Conference on Learning Representations (ICLR), 2021, 21 pages.
Esteves et al., "Learning SO(3) equivariant representations with spherical CNNs," Proceedings of European Conference on Computer Vision (ECCV), 2018, pp. 52-68.
Fayek et al., "Large scale audiovisual learn ing of sounds with weakly labeled data," IJCAI'20: Proceedings of the Twenty-Ninth International Joint Conference on Artificial Intelligence, Jan. 2021, 78:558-565.
Felleman et al., "Distributed hierarchical processing in the primate cerebral cortex," Cerebral Cortex, 1991, 1(1):1-47.
Ford et al., "A deep residual network for large-scale acoustic scene analysis," Proceedings of Interspeech, Sep. 15-19, 2019, pp. 2568-2572.
Fukushima, "Neocognitron: A self-organizing neural network model for a mechanism of pattern recognition unaffected by shift in position," Biological Cybernetics, 1980, (36):192-202.
Gehring et al., "Convolutional sequence to sequence learning," Proceedings of the 34th International Conference on Machine Learning (ICML), 2017, 10 pages.
Gemmeke et al., "Audio Set: An ontology and human-labeled dataset for audio events," IEEE International Conference on Acoustics, Speech and Signal Processing (ICASSP), 2017, 5 pages.
Girdhar et al., "Video action Transformer network," Proceedings of IEEE Conference on Computer Vision and Pattern Recognition (CVPR), 2019, 10 pages.

(56) References Cited

OTHER PUBLICATIONS

Goyal et al., "Coordination among neural modules through a shared global workspace," arXiv preprint arXiv:2103.01197, 2021, 23 pages.
Graves et al., "Neural Turing Machines," arXiv preprint arXiv:1410.5401, 2014, 26 pages.
Graves et al., "Speech recognition with deep recurrent neural networks," IEEE International Conference on Acoustics, Speech and Signal Processing (ICASSP), 2013, 5 pages.
Guo et al., "PCT: Point Cloud Transformer," arXiv preprint arXiv:2012.09688, 2020, 11 pages.
He et al., Deep residual learning for image recognition, Proceedings of IEEE Conference on Computer Vision and Pattern Recognition (CVPR), 2016, 9 pages.
Hendrycks et al., "AugMix: A simple data processing method to improve robustness and uncertainty," arXiv preprint arXiv:1912.02781, 2019, 15 pages.
Hendrycks et al., "Gaussian error linear units (GELUs)," arXiv preprint arXiv:1606.08415, 2016, 9 pages.
Ho et al., "Axial attention in multidimensional Transformers," arXiv preprint arXiv:1912.12180, 2019, 11 pages.
Hochreiter et al., "Long short-term memory," Neural Computation, 1997, 9(8):1735-1780.
Hu et al., "Bottom-up and top-down reasoning with hierarchical rectified gaussians," Proceedings of IEEE Conference on Computer Vision and Pattern Recognition (CVPR), 2016, 10 pages.
Incompleteideas.Net[online], "The Bitter Lesson," Mar. 13, 2019, retrieved on Jan. 26, 2023 retrieved from URL<http://www.incompleteideas.net/IncIdeas/BitterLesson/>, 2 pages.
International Search Report and Written Opinion in International Appln. No. PCT/EP2022/052569, dated Aug. 29, 2022, 16 pages.
Kaiser et al., "One model to learn them all," arXiv preprint arXiv:1706.05137, 2017, 10 pages.
Karpathy et al., "Large-scale video classification with convolutional neural networks," Proceedings of IEEE Conference on Computer Vision and Pattern Recognition (CVPR), 2014, 8 pages.
Katharopoulos et al., "Transformers are RNNs: Fast autoregressive Transformers with linear attention," Proceedings of International Conference on Machine Learning (ICML), 2020, 10 pages.
Kitaev et al., "Reformer: The efficient Transformer," Proceedings of International Conference on Learning Representations (ICLR), 2020, 12 pages.
Kohler et al., "Gestalt psychology," Psychologische Forschung, 1967, 31(1):XVIII-XXX.
Kong et al., "Audio set classification with attention model: A probabilistic perspective," IEEE International Conference on Acoustics, Speech and Signal Processing (ICASSP), 2018, 5 pages.
Kong et al., "Panns: Large-scale pretrained audio neural networks for audio pattern recognition," IEEE/ACM Transactions on Audio, Speech, and Language Processing, Aug. 2020, 15 pages.
Krizhevsky et al., "Imagenet classification with deep convolutional neural networks," Communications of the ACM, Jul. 2017, 60(6):84-90.
Kumar et al., "OBJ CUT," 2005 IEEE Computer Society Conference on Computer Vision and Pattern Recognition (CVPR'05), 3 pages.
Lan et al., "Albert: A lite BERT for self-supervised learning of language representations," Proceedings of International Conference on Learning Representations (ICLR), 2020, 17 pages.
LeCun et al., "Deep learning," Nature, May 28, 2015, 521(7553):436-444.
LeCun et al., "Gradient based learning applied to document recognition," Proceedings of the IEEE, Dec. 1998, 86(11):2278-2324.
Lee et al., "Making sense of vision and touch: Learning multimodal representations for contact-rich tasks," IEEE Transactions on Robotics, 2020, 36(3):14 pages.
Lee et al., "Set Transformer: A framework for attention-based permutation-invariant neural networks," Proceedings of International Conference on Machine Learning (ICML), 2019, 10 pages.
Lin et al., "Context-gated convolution," Proceedings of European Conference on Computer Vision (ECCV), 2020, 20 pages.
Locatello et al., "Object-centric learning with slot attention," 34th Conference on Neural Information Processing Systems (NeurIPS 2020), 2020, 14 pages.
Lollo et al., "Competition for consciousness among visual events: The psychophysics of reentrant visual processes," Journal of Experimental Psychology, 2000, 129(4):481-507.
Mildenhall et al., "Nerf: Representing scenes as neural radiance fields for view synthesis," Proceedings of European Conference on Computer Vision (ECCV), 2020, 25 pages.
Nyquist, "Certain topics in telegraph transmission theory," Transactions of the American Institute of Electrical Engineers, 1928, 47(2):617-644.
Olshausen et al., "A neurobiological model of visual attention and invariant pattern recognition based on dynamic routing of information," Journal of Neuroscience, Nov. 1993,13(11):47.
Park et al., "SpecAugment: A simple data augmentation method for automatic speech recognition," Proceedings of Interspeech, 2019, 6 pages.
Parmar et al., "Image Transformer," Proceedings of the 35th International Conference on Machine Learning, 2018, 10 pages.
Peng et al., "Random feature attention," Proceedings of International Conference on Learning Representations (ICLR), 2021, 19 pages.
Qi et al., "PointNet++: Deep hierarchical feature learning on point sets in a metric space," Proceedings of Neural Information Processing Systems (NeurIPS), 2017, 14 pages.
Radford et al., "Language models are unsupervised multitask learners," Technical Report, OpenAI, 2019, 24 pages.
Rae et al., "Compressive transformers for long-range sequence modelling," Proceedings of International Conference on Learning Representations (ICLR), 2020, 19 pages.
Ramachandran et al., "Stand-alone self-attention in vision models," Proceedings of Neural Information Processing Systems (NeurIPS), 2019, 13 pages.
Roy et al., "Efficient content-based sparse attention with routing Transformers," Transactions of the Association for Computational Linguistics (TACL), 2020, 24 pages.
Santoro et al., "Relational recurrent neural networks," 32nd Conference on Neural Information Processing Systems, 2018, 12 pages.
Shi et al., "Normalized cuts and image segmentation," IEEE Transactions on Pattern Analysis and Machine Intelligence, 1997, 22(8):888-905.
Simoncelli et al., "A model of neuronal responses in visual area MT," Vision Research, 1998, 38(5):743-761.
Simonyan et al., "Very deep convolutional networks for large-scale image recognition," Proceedings of International Conference on Learning Representations (ICLR), 2015, 14 pages.
Srinivas et al., "Bottleneck Transformers for visual recognition," IEEE, 2021, 11 pages.
Stanley, "Compositional pattern producing networks: A novel abstraction of development," Genetic programming and evolvable machines, 2007, 8(20):131-162.
Sukhbaatar et al., "Adaptive attention span in Transformers," Proceedings of the 57th Annual Meeting of the Association for Computational Linguistics, Aug. 2019, pp. 331-335.
Szegedy et al., "Going deeper with convolutions," Proceedings of IEEE Conference on Computer Vision and Pattern Recognition (CVPR), 2015, 12 pages.
Tancik et al., "Fourier features let networks learn high frequency functions in low dimensional domains," Proceedings of Neural Information Processing Systems (NeurIPS), 2020, 24 pages.
Tay et al., "Efficient Transformers: A survey," arXiv preprint arXiv:2009.06732, 2020, 39 pages.
Tay et al., "Long Range Arena: A benchmark for efficient Transformers," Proceedings of International Conference on Learning Representations (ICLR), 2021, 16 pages.
Touvron et al., "Training data-efficient image Transformers & distillation through attention," arXiv preprint arXiv:2012.12877, 2020, 22 pages.

(56) References Cited

OTHER PUBLICATIONS

Tran et al., "Learning spatiotemporal features with 3D convolutional networks," Proceedings of IEEE International Conference on Computer Vision (ICCV), 2015, 9 pages.

Vaswani et al., "Attention is all you need," Proceedings of Neural Information Processing Systems (NeurIPS), 2017, 15 pages.

Wang et al., "Axial-DeepLab: Stand-alone axial-attention for panoptic segmentation," Proceedings of European Conference on Computer Vision (ECCV), 2020, 26 pages.

Wang et al., "Linformer: Self-attention with linear complexity," arXiv preprint arXiv:2006.04768, 2020, 12 pages.

Wang et al., "Max-deeplab: End-to-end panoptic segmentation with mask transformers," Proceedings of IEEE Conference on Computer Vision and Pattern Recognition (CVPR), 2021, 20 pages.

Wang et al., "Non-local neural networks," Proceedings of IEEE Conference on Computer Vision and Pattern Recognition (CVPR), 2018, 10 pages.

Wang et al., "What makes training multi-modal classification networks hard?," Proceedings of the IEEE/CVF Conference on Computer Vision and Pattern Recognition, 2020, pp. 12695-12705.

Weston, "Memory Networks," Proceedings of International Conference on Learning Representations (ICLR), 2015, 15 pages.

Wolfe et al., "Why don't we see changes?: The role of attentional bottlenecks and limited visual memory," Visual Cognition, 2006, 14(4-8):749-780.

Wu et al., "3D shapenets: A deep representation for volumetric shapes," Proceedings of IEEE Conference on Computer Vision and Pattern Recognition (CVPR), 2015, 9 pages.

Wu et al., "Visual Transformers: Token-based image representation and processing for computer vision," arXiv preprint arXiv:2006.03677, 2020, 12 pages.

Xiao et al., "Audiovisual slowfast networks for video recognition," arXiv preprint arXiv:2001.08740, 2020, 14 pages.

Xiong et al., "Nystromformer: A Nystrom-based algorithm for approximating self-attention," Proceedings of the 35th AAAI Conference on Artificial Intelligence (AAAI-21), 2021, 11 pages.

Yang et al., "Convolutional neural networks with alternately updated clique," Proceedings of IEEE Conference on Computer Vision and Pattern Recognition (CVPR), 2018, 10 pages.

Ye et al., "Transformer: Modelling long-range context via binary partitioning," arXiv preprint arXiv:1911.04070, 2019, 11 pages.

You et al., "Large batch optimization for deep learning: Training bert in 76 minutes," Proceedings of International Conference on Learning Representations (ICLR), 2020, 37 pages.

Yu et al., "Multi-level attention model for weakly supervised audio classification," DCASE 2018 Workshop on Detection and Classification of Acoustic Scenes and Events, 2018, 5 pages.

Zhang et al., "A Simple Yet Effective Method for Video Temporal Grounding with Cross-Modality Attention," CoRR, Sep. 23, arxiv.org/abs/2009.11232, 9 pages.

Zhao et al., "Exploring self-attention for image recognition," Proceedings of IEEE Conference on Computer Vision and Pattern Recognition (CVPR), 2020, 10 pages.

Zoran et al., "Towards robust image classification using sequential attention models," Proceedings of IEEE Conference on Computer Vision and Pattern Recognition (CVPR), 2020, 15 pages.

Notice of Acceptance in Australian Appln. No. 2022216431, dated Jun. 28, 2024, 3 pages.

Notice of Allowance in Japanese Appln. No. 2023-547474, dated Oct. 28, 2024, 5 pages (with English translation).

Office Action in Canadian Appln. No. 3,207,436, dated Nov. 27, 2024, 4 pages.

Office Action in Indian Appln. No. 202327046495, mailed on Apr. 9, 2025, 6 pages (with English translation).

Afouras et al., "Deep Audio-Visual Speech Recognition," IEEE Transactions on Pattern Analysis and Machine Intelligence, Dec. 2022, 44(12):8717-8727.

Lee et al., "Parameter Efficient Multimodal Transformers for Video Representation Learning," CoRR, Dec. 8, 2020, arXiv.org:2012.04124, 17 pages.

Office Action in Canadian Appln. No. 3,207,436, dated Jun. 9, 2025, 7 pages.

Office Action in European Appln. No. 22707023.2, mailed on Jun. 17, 2025, 13 pages.

Sun et al., "VideoBERT: A Joint Model for Video and Language Representation Learning," 2019 IEEE/CVF International Conference on Computer Vision (ICCV), Oct. 27, 2019, pp. 7463-7472.

Notice of Allowance in Japanese Appln. No. 2024-205543, dated Sep. 2, 2025, 5 pages (with English translation).

Office Action in Chinese Appln. No. 202280013477.6, mailed on Aug. 30, 2025, 26 pages (with English translation).

\* cited by examiner

USING A NEURAL NETWORK TO GENERATE A NETWORK OUTPUT CHARACTERIZING AN ENTITY

EXAMPLE OF ENTITIES AND UNITS 500

POINT CLOUD 510

IMAGE 520

ANOTHER EXAMPLE OF ENTITIES AND UNITS 500

SEQUENCE OF WORDS 530

WORD 535

AUDIO WAVEFORM 540

AUDIO SAMPLE 545

PROTEIN 550

AMINO ACID 555

EXAMPLE ATTENTION MAPS 600

EXAMPLE CONFIGURATIONS OF A NEURAL NETWORK SYSTEM 700

| # cross-attends | Acc. | FLOPs | Params |
|---|---|---|---|
| 1 (at start) | 76.7 | 404.3B | 41.1M |
| 1 (interleaved) | 76.7 | 404.3B | 42.1M |
| 2 (at start) | 76.7 | 447.6B | 44.9M |
| 2 (interleaved) | 76.5 | 447.6B | 44.9M |
| 4 (at start) | 75.9 | 534.1B | 44.9M |
| 4 (interleaved) | 76.5 | 534.1B | 44.9M |
| 8 (at start) | 73.7 | 707.2B | 44.9M |
| 8 (interleaved) | 78.0 | 707.2B | 44.9M |

| | |
|---|---|
| ResNet-50 (He et al., 2016) | 77.6 |
| ViT-B-16 (Dosovitskiy et al., 2021) | 77.9 |
| ResNet-50 (FF) | 73.5 |
| ViT-B-16 (FF) | 76.7 |
| Transformer (64x64, FF) | 57.0 |
| Perceiver (FF) | 78.0 |

920

| | Raw | Perm. | Input RF |
|---|---|---|---|
| ResNet-50 (FF) | 73.5 | 39.4 | 49 |
| ViT-B-16 (FF) | 76.7 | 61.7 | 256 |
| Transformer (64x64) (FF) | 57.0 | 57.0 | 4,096 |
| Perceiver: | | | |
| (FF) | 78.0 | 78.0 | 50,176 |
| (Learned pos.) | 70.9 | 70.9 | 50,176 |

| | Accuracy |
|---|---|
| PointNet++ (Qi et al., 2017) | 91.9 |
| ResNet-50 (FF) | 66.3 |
| ViT-B-2 (FF) | 78.9 |
| ViT-B-4 (FF) | 73.4 |
| ViT-B-8 (FF) | 65.3 |
| ViT-B-16 (FF) | 59.6 |
| Transformer (44x44) | 82.1 |
| Perceiver | 85.7 |

1020

| | Audio | Video | A+V |
|---|---|---|---|
| Benchmark (Gemmeke et al., 2017 | 3.14 | - | - |
| Attention (Kong et al., 2018 | 32.7 | - | - |
| Multi-level Attention (Yu et al., 2018) | 36.0 | - | - |
| ResNet-50 (Ford et al., 2019) | 38.0 | - | - |
| CNN-14 (Kong et al., 2020) | 43.1 | - | - |
| CNN-14 (no balancing & no mixup) (Kong et al., 2020) | 37.5 | - | - |
| G-blend (Wang et al., 2020c) | 32.4 | 18.8 | 41.8 |
| Attention AV-fusion (Fayek & Kumar, 2020) | 38.4 | 25.7 | 46.2 |
| Perceiver (raw audio) | 38.3 | 25.8 | 43.5 |
| Perceiver (mel spectrogram) | 38.4 | 25.8 | 43.2 |
| Perceiver (mel spectrogram - tuned) | - | - | 44.2 |

FIG. 10

GENERATING NEURAL NETWORK OUTPUTS BY ENRICHING LATENT EMBEDDINGS USING SELF-ATTENTION AND CROSS-ATTENTION OPERATIONS

CROSS-REFERENCE TO RELATED APPLICATIONS

This application is a continuation of PCT Application No. PCT/EP2022/052569, filed on Feb. 3, 2022, which claims priority to Provisional Application No. 63/146,161, filed on Feb. 5, 2021, and each application is hereby incorporated by reference in its entirety.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that uses a neural network to generate a network output that characterizes an entity.

Throughout this specification, an embedding refers to an ordered collection of numerical values, e.g., a vector, matrix, or other tensor of numerical values.

A block refers to a group of one or more neural network layers in a neural network. The neural network can be configured to process data element embeddings that represent any appropriate type of entity. For example, the entity can include an image, an audio waveform, a point cloud (e.g., generated by a lidar or radar sensor), a protein, a sequence of words (e.g., that form one or more sentences or paragraphs), a video (e.g., represented a sequence of video frames), or a combination thereof.

The neural network can be configured to generate any appropriate neural network output that characterizes the entity. For example, the neural network output can be a classification output, a regression output, a sequence output (i.e., that includes a sequence of output elements), a segmentation output, or a combination thereof.

According to a first aspect, there is provided a method performed by one or more data processing apparatus for using a neural network to generate a network output that characterizes an entity. The method includes: obtaining a representation of the entity as a set of data element embeddings, obtaining a set of latent embeddings, and processing: (i) the set of data element embeddings, and (ii) the set of latent embeddings, using the neural network to generate the network output characterizing the entity. The neural network includes a sequence of neural network blocks including: (i) one or more cross-attention blocks, (ii) one or more self-attention blocks, and (iii) an output block. Each cross-attention block performs operations including: updating each latent embedding in the set of latent embeddings using attention over some or all of the data element embeddings in the set of data element embeddings. Each self-attention block performs operations including: updating each latent embedding in the set of latent embeddings using attention over the set of latent embeddings.

The output block performs operations including: after the set of latent embeddings are updated using the one or more cross-attention blocks and the one or more self-attention blocks, processing one or more latent embeddings from the set of latent embeddings to generate the network output characterizing the entity.

In some implementations, a number of latent embeddings in the set of latent embeddings is less than a number of data element embeddings in the set of data element embeddings.

In some implementations, a number of latent embeddings in the set of latent embeddings is predefined and independent of a number of data element embeddings in the set of data element embeddings.

In some implementations, the neural network includes multiple cross-attention blocks and multiple self-attention blocks, and the cross-attention blocks and the self-attention blocks are interleaved.

In some implementations, processing, by the output block, one or more latent embeddings from the set of latent embeddings to generate the network output characterizing the entity includes: pooling the latent embeddings in the set of latent embeddings to generate a pooled latent embedding, and processing the pooled latent embedding using one or more neural network layers to generate the network output characterizing the entity.

In some implementations, pooling the latent embeddings in the set of latent embeddings includes averaging the latent embeddings.

In some implementations, the network output characterizing the entity includes a sequence of output elements, and where processing, by the output block, one or more latent embeddings from the set of latent embeddings to generate the network output characterizing the entity includes, at each of multiple time steps: processing: (i) the one or more latent embeddings from the set of latent embeddings, and (ii) output elements generated at any preceding time steps, to generate an output element at the time step.

In some implementations, for each self-attention block, updating each latent embedding in the set of latent embeddings using attention over the set of latent embeddings includes: updating each latent embedding in the set of latent embeddings using query-key-value attention over the set of latent embeddings.

In some implementations, each self-attention block performs operations including: repeatedly updating each latent embedding in the set of latent embeddings using attention over the set of latent embeddings.

In some implementations, for each cross-attention block, updating each latent embedding in the set of latent embeddings using attention over some or all of the data element embeddings in the set of data element embeddings includes: updating each latent embedding in the set of latent embeddings using query-key-value attention over some or all of the data element embeddings in the set of data element embeddings, including: generating a respective query embedding for each latent embedding in the set of latent embeddings, generating a respective key embedding and a respective value embedding for each of multiple data element embeddings in the set of data element embeddings, and updating each latent embedding in the set of latent embeddings using query-key-value attention over multiple data element embeddings in the set of data element embeddings based on: (i) the query embeddings for the latent embeddings, and (ii) the key and value embeddings for the data element embeddings.

In some implementations, the entity includes multiple units arranged in a spatial structure, where each unit is associated with positional data that defines a respective position of the unit in the spatial structure, and where obtaining the representation of the entity as the set of data element embeddings includes: generating, for each unit in the entity, a feature embedding of the unit based on features of the unit, generating, for each unit in the entity, a positional embedding of the unit based on the position of the unit in the spatial structure, and generating, for each unit in the entity, a data element embedding of the unit based on: (i) the feature embedding of the unit, and (ii) the positional embedding of the unit.

In some implementations, for each unit in the entity, generating the data element embedding of the unit based on: (i) the feature embedding of the unit, and (ii) the positional embedding of the unit, includes: concatenating the feature embedding of the unit and the positional embedding of the unit.

In some implementations, the spatial structure is a one-dimensional (1D), two-dimensional (2D), or three-dimensional (3D) array of units.

In some implementations, generating, for each unit in the entity, the positional embedding of the unit based on the position of the unit in the spatial structure includes: generating, for each unit in the entity, a Fourier feature positional encoding having frequency bands that are spaced log-linearly over a predefined target frequency range.

In some implementations, the entity includes an image and each pixel in the image defines a respective unit in the entity.

In some implementations, the entity includes an audio waveform and each audio sample in the audio waveform defines a respective unit in the entity.

In some implementations, the entity includes a point cloud and each point in the point cloud defines a respective unit in the entity.

In some implementations, the entity includes a protein and each amino acid in an amino acid sequence of the protein defines a respective unit in the entity.

In some implementations, the entity includes a sequence of words and each word in the sequence of words defines a respective unit in the entity.

In some implementations, the sequence of neural network blocks of the neural network further includes one or more selection blocks, where each selection block performs operations including: after the set of latent embeddings are updated using one or more cross-attention blocks, one or more self-attention blocks, or both, processing the set of latent embeddings and the set of data element embeddings to generate a respective selection score for each data element embedding in the set of data element embeddings, and selecting a proper subset of the set of data element embeddings for use by one or more specified cross-attention blocks based on the selection scores, where each specified cross-attention block updates each latent embedding in the set of latent embeddings using attention over only data element embeddings in the selected proper subset of the set of data element embeddings.

In some implementations, each selection block includes: (i) a parameter selection neural network, and (ii) a unit selection neural network, and where for each selection block, processing the set of latent embeddings and the set of data element embeddings to generate the respective selection score for each data element embedding in the set of data element embeddings includes: processing the latent embeddings using the parameter selection neural network to generate a network output that defines values of a set of neural network parameters of the unit selection neural network, and processing each data element embedding in the set of data element embeddings using the unit selection neural network and in accordance with the values of the set of neural network parameters of the unit selection neural network to generate the selection score for the data element embedding.

In some implementations, selecting a proper subset of the data element embeddings for use by one or more specified cross-attention blocks based on the selection scores includes: selecting a predefined number of the data element embeddings having the highest selection scores in the set of data element embeddings.

In some implementations, the method further includes determining a task performance measure based on the network output characterizing the entity, determining a reward based on the task performance measure, and training the selection blocks on a reinforcement learning objective function that depends on the reward.

In some implementations, where the task performance measure comprises a cross-entropy classification error.

In some implementations, where the reinforcement learning objective function includes a squared Bellman error.

According to a second aspect, there are provided one or more non-transitory computer storage media storing instructions that when executed by one or more computers cause the one or more computers to perform the operations of the respective method of any preceding aspect. According to a third aspect, there is provided a system including: one or more computers; and one or more storage devices communicatively coupled to the one or more computers, where the one or more storage devices store instructions that, when executed by the one or more computers, cause the one or more computers to perform the operations of the respective method of any preceding aspect.

The subject matter described in this specification can be implemented in particular embodiments so as to realize one or more of the following advantages.

To generate an output that characterizes an entity (e.g., an image) represented as a set of embeddings (referred to as data element embeddings), the system described herein instantiates a set of latent embeddings, and processes both the data element embeddings and the latent embeddings using a neural network. The system can instantiate a predefined number of latent embeddings that is independent of the number of data element embeddings. As part of processing the data element embeddings and the latent embeddings, the neural network updates the set of latent embeddings using cross-attention over the set of data element embeddings, thereby enriching the latent embeddings with information from the data element embeddings. Moreover, because the number of latent embeddings is independent of the number of data element embeddings, the computational complexity of the cross-attention operation is partially decoupled from the number of data element embeddings and remains feasible even for large numbers of data element embeddings. Therefore, the system enables complex inputs represented by large numbers of data element embeddings (e.g., where each data element embedding represents a single pixel in an image) to be efficiently processed using attention operations while reducing consumption of computational resources (e.g., memory and computing power).

Rather than updating the latent embeddings using cross-attention over the full set of data element embeddings, the system can learn to adaptively select a proper subset of the data element embeddings for the latent embeddings to attend over. The system can thereby reduce the quantity of computational resources required to perform the cross-attention operation over the data element embeddings, while maintaining acceptable task performance (e.g., prediction accuracy) of the neural network.

The system described herein processes a set of data element embeddings representing an entity using attention operations that do not require assuming that the data element embeddings are associated with a fixed spatial arrangement. For example, the attention operations do not rely on assuming that the data element embeddings are associated with a spatial arrangement into a one-dimensional (1D) sequence (e.g., of audio data samples) or a two-dimensional (2D) grid (e.g., of image pixels). Rather, the system can flexibly incorporate information regarding the spatial arrangement of the data element embeddings by tagging (e.g., concatenating) positional encodings to the data element embeddings, and allowing the attention operations to learn to draw on this information when relevant to generating accurate network outputs. Therefore, the system can be used to process sets of data element embeddings that are not associated with a predefined spatial arrangement, e.g., sets of data elements representing point clouds or proteins, thereby making the system more broadly applicable. This flexibility also facilitates processing multimodal data, including high-bandwidth data such as video and audio data, using the same shared neural network architecture to perform a multimodal processing task. The reduction in computation provided by implementations of the system can be particularly significant in such tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 illustrates an example performance of different configurations of a neural network system that can characterize an entity.

FIG. 9 and FIG. 10 illustrate experimental results achieved using the neural network system.

Like reference numbers and designations in the various drawings indicate like elements.

DETAILED DESCRIPTION

Figure 1:
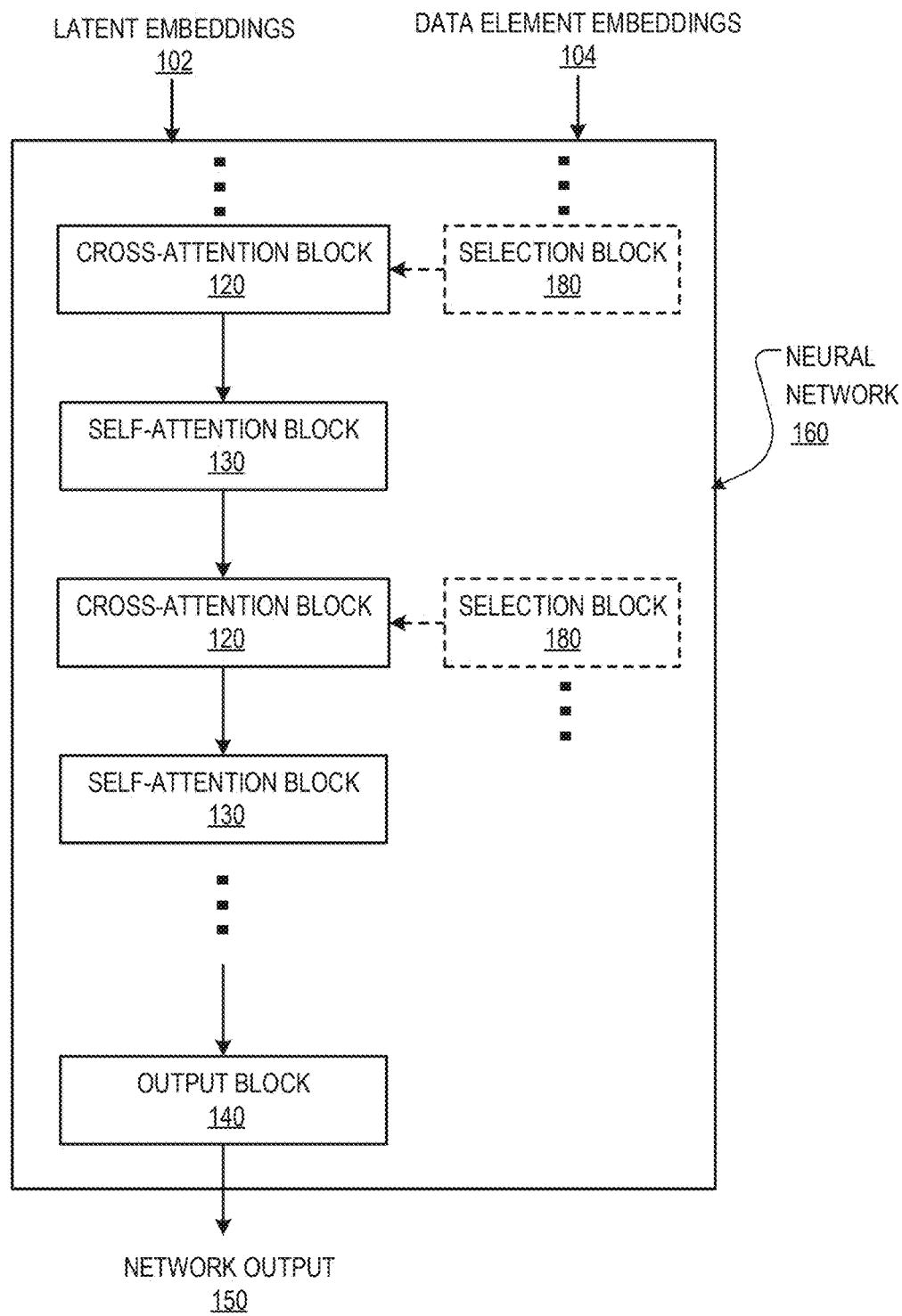
FIG. 1 is a block diagram of an example neural network system that can characterize an entity.

FIG. 1 is a block diagram of an example neural network system 100 that can generate a network output characterizing an entity 150. The neural network system 100 is an example of a system implemented as computer programs on one or more computers in one or more locations in which the systems, components, and techniques described below are implemented.

Throughout this specification an "entity" can include any appropriate type of data. For example, the entity can include an image, an audio waveform, a point cloud (e.g., generated by a lidar or radar sensor), a protein, a sequence of words (e.g., that form one or more sentences or paragraphs), a video (e.g., represented a sequence of video frames), or any other appropriate type of data or a combination thereof.

In some implementations, the entity can include multiple units arranged in a spatial structure, e.g., the entity can be an image and each unit can be a pixel in the image. Each unit, or data element, in the entity can have an associated data element embedding that can characterize, e.g., a position of the unit in the spatial structure and/or features associated with the unit in the spatial structure. Thus the entity may have a spatial structure and the units or data elements may have associated positions in the spatial structure. The spatial structure may correspond to a physical spatial structure e.g. pixels in an image, or an abstract spatial structure e.g. a time sequence of audio samples. Example entities and units are described in more detail below with reference to FIG. 5A and FIG. 5B.

The neural network system 100 can be configured to process: (i) a representation of the entity as a set of data element embeddings 104, and (ii) a set of latent embeddings 102 (e.g., initialized randomly), to generate the network output characterizing the entity 150. An example process for generating data element embeddings 104 representing an entity is described in more detail below with reference to FIG. 4. The network output 150 can be, e.g., a classification output, a regression output, a sequence output (i.e., that includes a sequence of output elements), a segmentation output, or any other appropriate network output or a combination thereof.

An "embedding" can generally refer to an ordered collection of numerical values, e.g., a vector, matrix, or other tensor of numerical values. A "data element embedding" can refer to an embedding of a data element that is associated with a particular unit in the entity. A "latent embedding" can refer to an embedding that is predefined and/or randomly initialized in a latent space. Generally, the data element embeddings and the latent embeddings can have any appropriate dimensionality. In some implementations, the dimensionality of the data element embeddings can be different from the dimensionality of the latent embeddings.

As will be described in more detail below, in some implementations, the number of latent embeddings 102 can be smaller than the number of data element embeddings 104. For example, if the entity is an image having dimensions 224×224 pixels, and the number of data element embeddings is M=50176, then the number of latent embeddings can be, e.g., N=512, such that N<<M. Furthermore, in some implementations, the number of latent embeddings 102 can be predefined and independent of the number of data element embeddings 104. For example, the latent embeddings 102 can be initialized randomly using, e.g., a Normal distribution. As a particular example, the latent embeddings can be initialized using a truncated normal distribution with mean 0, standard deviation 0.02, and truncation bounds [−2, 2]. Merely as another example of how the latent embeddings 102 may be obtained, these may comprise a set of learned weights, e.g. each weight defining an element of a "Latent array" as described later. In some implementations, the number of latent embeddings 102 can be a hyper-parameter of the neural network system 100.

As described above, the neural network system 100 can be configured to process the data element embeddings representing the entity 104 and the latent embeddings 102 to generate the network output characterizing the entity 150. More specifically, the neural network system 100 can include a neural network 160 having a sequence of one or more neural network blocks. A "neural network block" can generally refer to a group of one or more neural network layers in a neural network. The sequence of neural network blocks can include: (i) one or more cross-attention blocks 120, (ii) one or more self-attention blocks 130, e.g. following the cross-attention block(s) 120, and (iii) an output block 140. In one example, as illustrated in FIG. 1, the sequence of neural network blocks can include a first cross-attention block 120, followed by a first self-attention block 130, followed by a second cross-attention block 120, followed by a second self-attention block 130, followed by an output block 140. The neural network system 100 can use the sequence of neural network blocks to process the data element embeddings 104 and the latent embeddings 102 and generate the network output characterizing the entity 150.

The attention blocks (e.g., the cross-attention block 120 and the self-attention block 130) can be configured to perform an attention operation, e.g., update each embedding in a first set of embeddings using attention over a second set of embeddings. In general updating a first set of embeddings using attention over a second set of embeddings refers to updating the first set of embeddings by applying an attention mechanism over the second set of embeddings; there are many different possible attention mechanisms that can be used. For example, for each target embedding in the first set of embeddings, each attention block can generate a respective attention weight for each embedding in the second set of embeddings, and generate a combined embedding based on the second set of embeddings and the corresponding attention weights. As a particular example, each attention block can generate the combined embedding as a weighted sum of the second set of embeddings, e.g., by multiplying each embedding in the second set of embeddings with the corresponding weight and summing the weighted embeddings. Each attention block can then use the combined embedding to update the target embedding in the first set of embeddings, e.g., by replacing the target embedding with the combined embedding, adding the combined embedding to the target embedding, or in any other appropriate manner.

In some implementations, the attention blocks can perform a query-key-value (QKV) attention operation, e.g., update each embedding in the first set of embeddings using attention over the second set of embeddings using query (Q), key (K), and value (V) embeddings. In particular, each attention block can include: (i) a query sub-network, (ii) a key sub-network, and (iii) a value sub-network. For each target embedding in the first set of embeddings, the query sub-network can be configured to process the target embedding in the first set of embeddings to generate a respective query embedding (Q) for the target embedding. The key sub-network can be configured to process each embedding in the second set of embeddings to generate a respective key embedding (K) for each embedding in the second set of embeddings. Similarly, the value sub-network can be configured to process each embedding in the second set of embeddings to generate a respective value embedding (V) for each embedding in the second set of embeddings.

Each attention block can then use the query embeddings (Q), the key embeddings (K), and the value embeddings (V), to update each target embedding in the first set of embeddings over the second set of embeddings. Specifically, each attention block can generate the attention weight for each embedding in the second set of embeddings, e.g., as an inner (e.g., dot) product of the query embedding (Q) with each of the key embeddings (K). Based on the second set of embeddings and the attention weights, each attention block can generate the combined embedding, e.g., as a linear combination of the value embeddings (V) weighted by their respective attention weights. Lastly, each attention block can update the target embedding in the first set of embeddings using the combined embedding, e.g., by replacing the target embedding in the first set of embeddings with the weighted sum of the value embeddings (V).

In some implementations, the first set of embeddings and the second set of embeddings can be different sets of embeddings. In such cases, the attention operation (e.g., the QKV attention operation) can be referred to as a "cross-attention" operation. The cross-attention operation can be performed by, e.g., the cross-attention block 120. For example, the first set of embeddings can be the set of latent embeddings 102, the second set of embeddings can be the data element embeddings 104, and the cross-attention block 120 can update each latent embedding using cross-attention over some, or all, data element embeddings in the set of data element embeddings 104.

In some implementations, the first set of embeddings and the second set of embeddings can be the same set of embeddings. In such cases, the attention operation (e.g., the QKV attention operation) can be referred to as a "self-attention" operation. The self-attention operation can be performed by, e.g., the self-attention block 130. For example, the first set of embeddings can be the set of latent embeddings 102, the second set of embeddings can also be the set of latent embeddings, and the self-attention block 130 can update each latent embedding in the set of latent embeddings 102 using self-attention over the set of latent embeddings. In some implementations, the self-attention block 130 can repeatedly update each latent embedding in the set of latent embeddings using self-attention over the set of latent embeddings.

In some implementations, the neural network 160 can further include one or more selection blocks 180. The selection blocks 180 can select a subset of data element embeddings from the set of data element embeddings 104 for the cross-attention block 120 to attend over. In other words, in some implementations, the cross-attention block 120 can update each latent embedding in the set of latent embeddings 102 using cross-attention over only the subset of data element embeddings selected by the selection block 180. An example selection block 180 is described in more detail below with reference to FIG. 3.

In some implementations, the cross-attention block 120 and the self-attention block 130 can be configured to perform other operations in addition to the attention operation described above. For example, in addition to implementing one or more attention neural network layers, the attention blocks can also include any other neural network layers (e.g., convolutional layers, fully connected layers, recurrent layers, attention layers, etc.) in any appropriate numbers (e.g., 2 layers, 5 layers, or 10 layers) and connected in any appropriate configuration (e.g., as a linear sequence of layers).

In some implementations, each attention block can further include one or more normalization neural network layers that can be configured to process the embeddings (e.g., data element embeddings 104 and/or the latent embeddings 102) and alter the dimensionality of the embeddings. For example, if each data element embedding includes, e.g., C channels (components), and each latent embedding includes, e.g., D channels, the one or more normalization layers can process the embeddings to generate an output that includes data element embeddings and latent embeddings having the same number of channels, e.g., C channels.

In some implementations, each attention block can further include one or more neural network layers that are configured to combine an input into each attention block with an output from each respective attention block and normalize the combination. For example, the one or more neural network layers can be configured to combine the latent embeddings input into the self-attention block 130 with the latent embeddings output from the self-attention block 130 (e.g., with the latent embeddings that have been updated by the self-attention block 130 using the self-attention operation described above).

In addition to the cross-attention block 120 and the self-attention block 130, the neural network 160 can further include the output block 140. The output block 140 can process an output from the last attention block in the sequence of attention blocks (e.g., from the self-attention block 130 in FIG. 1) to generate the network output characterizing the entity 150. For example, the output block 140 can pool (i.e., combine, e.g., average pool or max pool) the latent embeddings included in the output to generate a pooled latent embedding, e.g., a global summary vector. The output block 140 can process the pooled latent embedding using one or more neural network layers included in the output block 140 to generate the network output characterizing the entity 150. For example a single linear neural network layer can project the global summary vector to a number of target classes or categories to provide a classification output.

In some implementations, the network output characterizing the entity 150 can have a sequence of output elements. In such cases, at each time step in a sequence of time steps, the output block 140 can process the output from the last attention block in the sequence of attention blocks and the output elements generated at any preceding time step to generate an output element for the time step.

As described above, the neural network system 100 can update each latent embedding in the set of latent embeddings 102 using cross-attention over some, or all, data element embeddings in the set of data element embeddings 104. Every time the system 100 performs the cross-attention operation, the system 100 enriches the latent embeddings 102 with information from the data element embeddings 104. Because the number of latent embeddings 102 (e.g., N) is independent from the number of data element embeddings 104 (e.g., M), the computational complexity of the cross-attention operation is partially decoupled from the number of data element embeddings 104 and remains feasible even for large numbers of data element embeddings 104. Therefore, the neural network system 100 can process large and complex inputs while reducing consumption of computational resources (e.g., memory and computing power).

Furthermore, the neural network system 100 can update the set of latent embeddings that are enriched with information from the data element embeddings using self-attention over the set of latent embeddings, e.g., the self-attention operation is independent from the number of data element embeddings. For example, the cross-attention operation can have complexity of $\sim MN$ and the self-attention operation can have complexity $\sim N^2$, where $N \ll M$. Because the computational complexity of the self-attention operation is decoupled from the number of data element embeddings the neural network system 100 can process large inputs and repeatedly perform the self-attention operation without significantly increasing computational complexity. Therefore, the neural network system 100 is able to exhibit high prediction accuracy while simultaneously reducing consumption of computational resources (e.g., memory and computing power).

Generally, the neural network 160 can have any appropriate neural network architecture that enables it to perform its prescribed function. For example, the neural network 160, and each of the cross attention block 120, the self-attention block 130, the output block 140, and the selection block 180, can have any appropriate neural network layers (e.g., convolutional layers, fully connected layers, recurrent layers, attention layers, etc.) in any appropriate numbers (e.g., 2 layers, 5 layers, or 10 layers) and connected in any appropriate configuration (e.g., as a linear sequence of layers). The neural network system 100 can also additionally include any number of neural network blocks configured to perform any appropriate operation.

Although the cross-attention blocks 120 and the self-attention blocks 130 are shown as interleaved in FIG. 1, the attention blocks can be arranged in any appropriate configuration. For example, the system 100 can include a sequence of attention blocks having two cross-attention blocks 120, followed by two self-attention blocks 130, followed by two cross-attention blocks 120. In another example, the system 100 can include a sequence of attention blocks having one cross-attention block 120 followed by multiple self-attention blocks 130. Generally, the system 100 can include any number of attention blocks 120, 130 and/or selection blocks 180 (e.g., 5, 10, 100, etc.) arranged in any appropriate configuration.

The neural network system 100 can further include a training engine that can train the neural network 160 on a set of training data over multiple training iterations. The training data can include a set of training examples, where each training example specifies: (i) a training input, and (ii) a target output that should be generated by the neural network 160 by processing the training input.

At each training iteration, the training engine can sample a batch of training examples from the training data, and process the training inputs specified by the training examples using the sequence of neural network blocks included in the neural network 160 to generate corresponding network outputs. In particular, for each training input, the neural network 160 processes the training input using the current model parameter values of a first attention block in the sequence (e.g., the cross-attention block 120 in FIG. 1) to generate an output from the first attention block. The neural network 160 processes the output generated by the first attention block in the sequence using the current model parameter values of a second attention block in the sequence (e.g., the self-attention block 130 in FIG. 1) to generate an output from the second attention block in the sequence. The neural network 160 processes an output generated by the last attention block in the sequence (e.g., the self-attention block 130 in FIG. 1) using the current model parameter values of the output block 140 to generate the network output corresponding to the training input.

The training engine can adjust the model parameter values of the attention blocks 120, 130 and the output block 140, and in some implementations values for the latent embeddings 102, to optimize an objective function that measures a similarity between: (i) the network outputs generated by the neural network 160, and (ii) the target network outputs specified by the training examples. The objective function can be, e.g., a cross-entropy objective function, a squared-error objective function, or any other appropriate objective function.

The training engine can determine gradients of the objective function, e.g., using backpropagation techniques. The training engine can update the model parameter values of the attention blocks 120, 130 and the output block 140 using the gradients, e.g., using any appropriate gradient descent optimization algorithm, e.g., Adam. The training engine can determine a performance measure of the neural network 160 on a set of validation data that is not used during training of the neural network 160.

As described above, in some implementations, neural network system 100 can further include one or more selection blocks 180. The training engine can train the one or more selection blocks 180 using reinforcement learning techniques, as described in more detail below with reference to FIG. 3. After training, the neural network system 100 can be used to perform a machine learning task, e.g., to process an input and generate an output characterizing an entity.

The neural network system 100 can be configured to perform any appropriate machine learning task. A few examples follow.

In some implementations, the neural network system 100 can process a set of data element embeddings 104 that represent the pixels of an image to generate a classification output 150 that includes a respective score for each object category in a set of possible object categories (e.g., vehicle, pedestrian, bicyclist, etc.). The score for an object category can define a likelihood that the image depicts an object that belongs to the object category.

In some implementations, the system 100 can process a set of data element embeddings 104 that represent audio samples in an audio waveform to perform speech recognition, i.e., to generate an output 150 that defines a sequence of phonemes, graphemes, characters, or words corresponding to the audio waveform.

In some implementations, the system 100 can process a set of data element embeddings 104 that represent words in a sequence of words to perform a natural language processing task, e.g., topic classification or summarization. To perform topic classification, the system 100 can generate a network output 150 that includes a respective score for each topic category in a set of possible category categories (e.g., sports, business, science, etc.). The score for a topic category can define a likelihood that the sequence of words pertains to the topic category. To perform summarization, the system can generate a network output 150 that includes an output sequence of words that has a shorter length than the input sequence of words and that captures important or relevant information from the input sequence of words.

In some implementations, the system 100 can perform a neural machine translation task, e.g., to process a set of data element embeddings 104 that represent a sequence of text, e.g., a sequence of words, phrases, characters, or word pieces, in one language, to generate a network output 150 that may be a translation of the sequence of text into another language, i.e., a sequence of text in the other language that is a translation of the input sequence of text. As a particular example, the task may be a multilingual machine translation task, where the system 100 is configured to translate between multiple different source language-target language pairs. In this example, the source language text may be augmented with an identifier that indicates the target language into which the neural network should translate the source language text.

In some implementations, the system 100 can perform an audio processing task. For example, if the data element embeddings 104 represent a spoken utterance, then the output 150 generated by the system 100 may be a score for each of a set of pieces of text, each score representing an estimated likelihood that the piece of text is the correct transcript for the utterance. As another example, if the data element embeddings 104 represent a spoken utterance, the output 150 generated by the system 100 can indicate whether a particular word or phrase ("hotword") was spoken in the utterance. As another example, if the data element embeddings 104 represent a spoken utterance, the output 150 generated by the system 100 can identify the natural language in which the utterance was spoken.

In some implementations, the system 100 can perform a natural language processing or understanding task, e.g., an entailment task, a paraphrase task, a textual similarity task, a sentiment task, a sentence completion task, a grammaticality task, and so on, that operates on a set of data element embeddings 104 representing text in some natural language.

In some implementations, the system 100 can perform a text to speech task, where the data element embeddings 104 represent text in a natural language or features of text in a natural language and the network output 150 is a spectrogram, a waveform, or other data defining audio of the text being spoken in the natural language.

In some implementations, the system 100 can perform a health prediction task, where the data element embeddings 104 represent data derived from electronic health record data for a patient and the output 150 is a prediction that is relevant to the future health of the patient, e.g., a predicted treatment that should be prescribed to the patient, the likelihood that an adverse health event will occur to the patient, or a predicted diagnosis for the patient.

In some implementations, the system 100 can perform a text generation task, where the data element embeddings 104 represent a sequence of text, and the output 150 is another sequence of text, e.g., a completion of the input sequence of text, a response to a question posed in the input sequence, or a sequence of text that is about a topic specified by the first sequence of text. As another example, the data element embeddings 104 can represent data other than text, e.g., an image, and the output sequence 150 can be text that describes the data represented by the data element embeddings 104.

In some implementations, the system 100 can perform an image generation task, where the data element embeddings 104 represent a conditioning input and the output 150 is a sequence of intensity value inputs for the pixels of an image.

In some implementations, the system 100 can perform an agent control task, where the data element embeddings 104 represent a sequence of one or more observations or other data characterizing states of an environment and the output 150 defines an action to be performed by the agent in response to the most recent data in the sequence. The agent can be, e.g., a real-world or simulated robot, a control system for an industrial facility, or a control system that controls a different kind of agent.

In some implementations, the system 100 can perform a genomics task, where the data element embeddings 104 represent a fragment of a DNA sequence or other molecule sequence and the output 150 is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some implementations, the system 100 can perform a protein modeling task, e.g., where the data element embeddings 104 represent a protein and the network output 150 characterizes the protein. For example, the network output 150 can characterize a predicted stability of the protein or a predicted structure of the protein.

In some implementations, the system 100 can perform a point cloud processing task, e.g., where the data element embeddings 104 represent a point cloud (e.g., generated by a lidar or radar sensor) and the network output 150 characterizes, e.g., a type of object represented by the point cloud.

In some implementations, the system 100 can perform a combination of multiple individual machine learning tasks, i.e., the system 100 is configured to perform multiple different individual machine learning tasks, e.g., two or more of the machine learning tasks mentioned above. For example, the system 100 can be configured to perform multiple individual natural language understanding tasks, with the data element embeddings 104 processed by the neural network include an identifier for the individual natural language understanding task to be performed on data element embeddings.

The neural network system 100 is described in more detail below with reference to FIG. 2.

Figure 2:
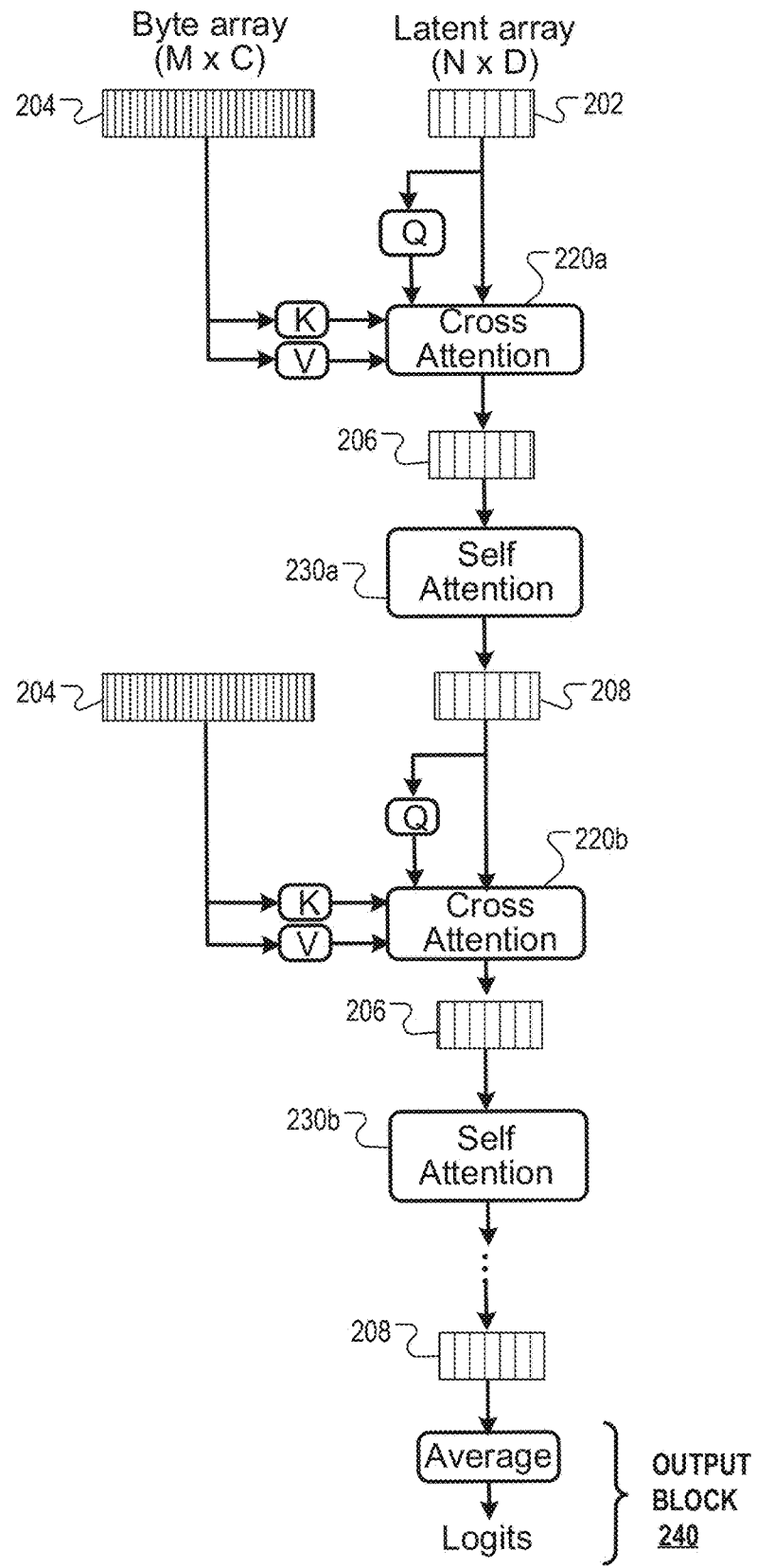
FIG. 2 is a block diagram of the example neural network system in more detail.

FIG. 2 is a block diagram of an example neural network system 200 (e.g., the neural network system 100 in FIG. 1) in more detail. The neural network system 200 is an example of a system implemented as computer programs on one or more computers in one or more locations in which the systems, components, and techniques described below are implemented.

The neural network system 200 can include a sequence of neural network blocks, e.g., one or more attention blocks, an output block, and optionally one or more selection blocks. A particular example is illustrated in FIG. 2, where the neural network system 200 includes a first cross-attention block 220a, followed by a first self-attention block 230a, followed by a second cross-attention block 220b, followed by a second self-attention block 230b, followed by an output block 240.

As described above with reference to FIG. 1, the neural network system 200 can be configured to process a set of data element embeddings representing an entity 204 (e.g., an image), and a set of latent embeddings 202 (e.g., initialized randomly) to generate a network output characterizing the entity. The set of data element embeddings 204 (e.g., "Byte array') can have dimensions M×C, where M is the number of data element embeddings, and C is the number of channels of each data element embedding. For example where the entity comprises an image M may be a number of pixels in the image and C a number of channels per pixel. The set of latent embeddings 202 (e.g., "Latent array") can have dimensions N× D, where N is the number of latent embeddings, and D is the number of channels of each latent embedding. In some implementations, N is predefined and independent from M. In some implementations, N<<M. In some implementations, N and D are hyperparameters that can be chosen according to available computational resources.

Each attention block can be configured to update each embedding in a first set of embeddings using attention over some, or all, embeddings in a second set of embeddings. Specifically, each cross-attention block 220a, 220b can be configured to generate a cross-attention output 206 by updating each latent embedding in the set of latent embeddings 202 using cross-attention over some, or all, data element embeddings in the set of data element embeddings 204. Similarly, each self-attention block 230a, 230b can be configured to generate a self-attention output 208 by updating each latent embedding in the set of latent embeddings 202 using self-attention over the set of latent embeddings.

As described above with reference to FIG. 1, the cross-attention and the self-attention operations can be implemented as a query-key-value (QKV) attention. For example, each of the attention block can use a query sub-network to generate a query embedding ("Q"), a key sub-network to generate a key embedding ("K"), and a value sub-network to generate a value embedding ("V"). The cross-attention blocks 220a, 220b and the self-attention blocks 230a, 230b can use the query, key, and value embeddings to perform the cross-attention operation and the self-attention operation, respectively.

The output block 240 can receive an output from the last attention block in the sequence (e.g., the self-attention output 208 from the self-attention block 230b) and process it to generate the network output characterizing the entity. Specifically, the output block 240 can include one or more neural network layers (e.g., "Average" in FIG. 2) that are configured to pool the latent embeddings to generate a pooled latent embedding. The output block 240 can process the pooled latent embedding using one or more additional neural network layers to generate the output characterizing the entity.

As described above with reference to FIG. 1, the attention blocks 220, 230 and the output block 240 can each have a respective set of model parameters that can be trained by a training engine. In some implementations, the neural network system 200 can share the model parameter values between different neural network blocks. For example, the system 200 can share the model parameter values between the first cross-attention block 220a and the second cross-attention block 220b. Similarly, the system 200 can share the model parameter values between the first self-attention block 230a and the second self-attention block 230b. In some implementations, the system 200 can refrain from sharing the model parameter values between the first cross-attention block 220a and any other neural network blocks in the system 200.

Sharing model parameter values between different neural network blocks can improve the performance of the trained neural network system 200, e.g., by reducing the likelihood of over-fitting and, in some cases, reducing the total number of model parameters of the system 200. As a result, the system 200 can require less training data, fewer training iterations, or both, to achieve a threshold level of performance (e.g., prediction accuracy).

As described above, in some implementations, the neural network system 200 can additionally include one or more selection blocks (e.g., selection blocks 180 in FIG. 1). Each selection block can be configured to select a subset of data element embeddings from the set of data element embeddings 204 for some, or all, cross-attention blocks (e.g., blocks 220a, 220b) to attend over. In such cases, the cross-attention blocks can update each latent embedding in the set of latent embeddings 202 using cross-attention over only the subset of data element embeddings selected by the selection block.

As a particular example, in some implementations, the entity can be a 1-second long video at 224×224 pixel image resolution having 24 frames per second. In such cases, the number of data element embeddings can be extremely large, e.g., ~1.2 million. If reducing the number of data element embeddings is desired the system can subsample or generate embeddings of video patches extending over space and/or time. In some implementations the system 200 can use the selection block to adaptively select a subset of data element embeddings from ~1.2 million data element embeddings for the cross-attention blocks to attend over. An example selection block is described in more detail below.

Figure 3:
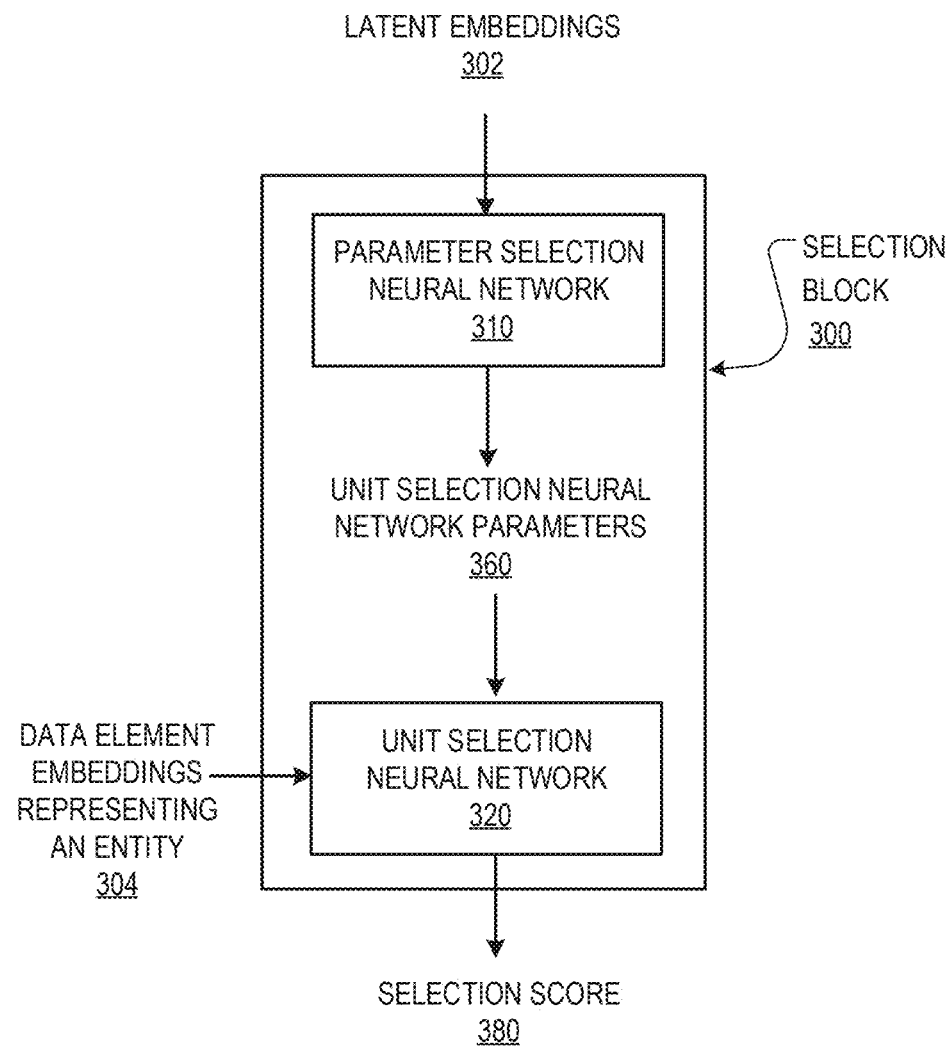
FIG. 3 is a block diagram of an example selection neural network block included in a neural network system that can characterize an entity.

FIG. 3 is a block diagram of an example selection block 300 included in a neural network system used to generate a network output characterizing an entity (e.g., the neural network system 100 in FIG. 1 or the neural network system 200 in FIG. 2). The selection block 300 is an example of a system implemented as computer programs on one or more computers in one or more locations in which the systems, components, and techniques described below are implemented.

The selection block 300 can be configured to process a set of data element embeddings representing the entity 304 (e.g., an image) and a set of latent embeddings 302 (e.g., initialized randomly) to select a proper subset of data element embeddings from the set of data element embeddings 304. The neural network system can provide the subset of data element embeddings to one or more cross-attention blocks to attend over. Specifically, the one or more cross-attention blocks can update each latent embedding in a set of latent embeddings using cross-attention over only the subset of data element embeddings selected by the selection block 300.

In some implementations, the system can use only one selection block to select the subset of data element embeddings and provide the subset to one or more cross-attention blocks to attend over. In some implementations, the system can use multiple selection blocks to select the subset of data element embeddings. For example, each selection block can select a different subset of data element embeddings from the set of data element embeddings. In some implementations, the system can provide each subset selected by a respective selection block to a respective cross-attention block to attend over, e.g., some cross-attention blocks can attend over different subsets of data element embeddings. The selection block 300 can select any number of data element embeddings, e.g., less than 50%, 25%, 10%, or 5% of the full set of data element embeddings 304.

The selection block 300 can select the subset of data element embeddings by using: (i) a parameter selection neural network 310, and (ii) a unit selection neural network 320, each of which will be described in more detail next.

After the neural network system has updated the set of latent embeddings 302 using one or more cross-attention blocks, one or more self-attention blocks, or both (e.g., as described above with reference to FIG. 1 and FIG. 2), the parameter selection neural network 310 can process the latent embeddings 302 to generate a network output that defines values of unit selection neural network parameters 360. For example, in some implementations, the unit selection neural network 320 can include one or more fully-connected neural network layers, each of which can have a corresponding tensor (e.g., matrix) of unit selection neural network parameters. The output 360 from the parameter selection neural network 310 can accordingly include, e.g., an ordered collection of numerical values that define the parameter values of these fully-connected neural network layers of the unit selection neural network 320.

The unit selection neural network 320 can process each data element embedding in the set of data element embeddings 304 in accordance with the values of the unit selection neural network parameters (e.g., generated by the parameter selection neural network 310) to generate a selection score 380 for each data element embedding 304. In one example, the selection score 380 for each data element embedding can be a one-dimensional value, e.g., a reinforcement learning Q-value.

Based on the selection scores 308, the selection block 300 can select the subset of data element embeddings from the full set of data element embeddings 304. For example, the selection block can select one or more data element embeddings from the set of data element embeddings 304 having the highest selection score. In another example, the selection block 300 can select a predefined fraction of data element embeddings from the set of data element embeddings 304, e.g., 5% of data element embeddings having the highest selection scores.

Accordingly, the selection block 300 can adaptively select a suitable subset of data element embeddings from the full set of data element embeddings 304. For example, if the entity is a 1-second long video at 224×224 pixel image resolution, the selection block 300 can select the subset of data element embeddings corresponding to, e.g., most valuable 10,000 pixels of the video.

As described above with reference to FIG. 1, a training engine can adjust model parameter values of one or more attention blocks and an output block using, e.g., supervised learning techniques. The training engine can additionally train one or more selection blocks using e.g., reinforcement learning techniques. For example, the training engine can train the selection block 300 by iteratively adjusting the model parameter values of the selection block 300 by iteratively backpropagating gradients of a reinforcement learning objective function through the selection block 300. The reinforcement learning function can be, e.g., a squared Bellman error objective function, or any other appropriate reinforcement learning objective function. In some implementations, the training engine can determine the overall loss of the neural network (e.g., of one or more attention blocks, an output block, and a selection block) as a linear combination of the supervised loss and the reinforcement learning loss.

To train the selection block 300, at each training iteration, the training engine can use the neural network to process a set of data element embeddings and a set of latent embeddings (e.g., as described above with reference to FIG. 1) to generate a network output characterizing an entity. The training engine can determine a task performance measure based on the network output characterizing the entity. For example, the training engine can evaluate the same objective function described above with reference to FIG. 1 that is used by the training engine to train the attention blocks and the output block. In other words, the training engine can train the selection block 300 directly on the same classification signal used to train the rest of the neural network, e.g., as described above with reference to FIG. 1

Next, at each training iteration, the training engine can determine a reward based on the task performance measure. The reward can be any appropriate function of the task performance measure. In one example, the task performance measure can characterize a prediction error (e.g., by way of cross-entropy loss), and the reward can be a negative of the task performance measure, such that a lower prediction error results in a higher reward.

Based on the reward, the training engine can train the selection block 300 on a reinforcement learning objective function that depends on the reward. The reinforcement learning objective function can encourage the selection of data element embeddings that result in an increase in the reward received by the neural network.

As a particular example, the training engine can train the selection block 300 by minimizing the squared Bellman error objective function:

$$E[(R-Q(x_i;\phi(z_l)))^2] \quad (1)$$

where $Q(x_i;.)$ is the output of the selection block 300 for the data element embedding $x_i$, $\phi(z_l)$ is the output from the l-th self-attention block, and R is the task performance measure (e.g., a negative cross-entropy classification error).

After training the selection block 300, the neural network system can use the selection block 300 to select a subset of data element embeddings from the full set of data element embeddings 304. The system can provide the subset of data element embeddings to one or more cross-attention blocks to attend over. Rather than updating each latent embedding using cross-attention over the full set of data element embeddings, the one or more cross-attention blocks can update each latent embedding over only the subset of data element embeddings adaptively selected by the selection block 300. The system can thereby reduce the quantity of computational resources required to perform the cross-attention operation over the data element embeddings, while maintaining acceptable task performance (e.g., prediction accuracy).

Example process for using the neural network system to generate the network output characterizing the entity will be described in more detail next.

Figure 4:
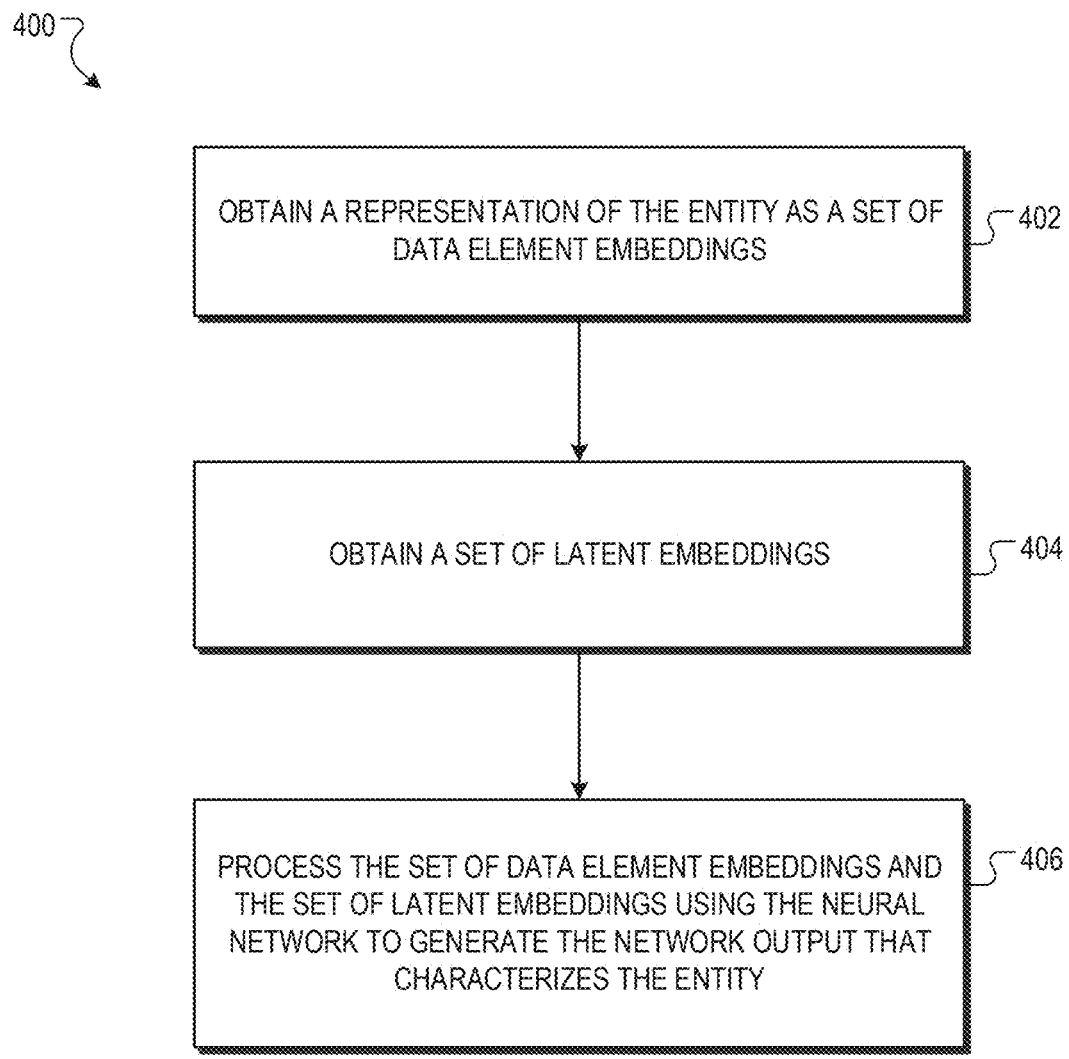
FIG. 4 is a flow diagram of an example process for using a neural network system to characterize an entity.

FIG. 4 is a flow diagram of an example process 400 for using a neural network system to characterize an entity. For convenience, the process 400 will be described as being performed by a system of one or more computers located in one or more locations. For example, a neural network system, e.g., the neural network system 100 in FIG. 1, or the neural network system 200 in FIG. 2, appropriately programmed in accordance with this specification, can perform the process 400.

The system obtains a representation of the entity as a set of data element embeddings (402). The entity can include, e.g., multiple units arranged in a spatial structure (as a one-dimensional (1D), two-dimensional (2D), or three-dimensional (3D) array of units), where each unit is associated with positional data that defines a respective position of the unit in the spatial structure. For example, the entity can include an image and each pixel in the image can define a respective unit in the entity. In another example, the entity can include an audio waveform and each audio sample in the audio waveform, or e.g. in a mel spectrogram of the audio waveform, can define a respective unit in the entity. In yet another example, the entity can include a point cloud and each point in the point cloud can define a respective unit in the entity. In yet another example, the entity can include a protein and each amino acid in an amino acid sequence of the protein can define a respective unit in the entity. In yet another example, the entity can include a sequence of words and each word in the sequence of words can define a respective unit in the entity. Example entities and units are described in more detail below with reference to FIG. 5A and FIG. 5B.

Obtaining the representation of the entity as the set of data element embeddings can include generating, for each unit in the entity, a data element embedding of the unit. For each unit in the entity, the system can generate the data element embedding based on a feature embedding and a positional embedding of the unit.

The system can generate the feature embedding based on the features of the unit. For example, if the entity is an image (e.g., the image 520 in FIG. 5), and the unit is a pixel in the image (e.g., the pixel 525 in FIG. 5), the system can obtain the feature embedding by selecting a patch of image around that pixel and concatenating it into a vector. In another example, if the entity is an audio waveform (e.g., the audio waveform 540 in FIG. 5), and the unit is an audio sample (e.g., the audio sample 545 in FIG. 5), then the system can obtain the feature embedding at a time point by selecting the amplitude of the audio sample at that time point.

The system can generate the positional embedding based on the position of the unit in the spatial structure. For example, if the spatial structure of the entity is one-dimensional, e.g., the entity is a sequence of words (e.g., the sequence of words 530 in FIG. 5) and the unit is a word in the sequence (e.g., the word 535 in FIG. 5), then the system can generate the positional embedding based on the index of the word in the sequence of words. In another example, if the entity is a two-dimensional array of pixels, then the system can generate the positional embedding based on the x-y coordinates of the pixel in the array of pixels. In yet another example, if the entity is a point cloud (e.g., the point cloud 510 in FIG. 5), and the unit is a point in the point cloud (e.g., the point 515 in FIG. 5), then the system can generate the positional embedding based on the x-y-z coordinates of the point in the point cloud.

Generally, for each unit in the entity, the system can generate the positional embedding as any appropriate function of the position of the unit in the spatial structure. In some implementations, the positional embedding can be, e.g., a Fourier feature positional encoding having frequency bands that are spaced log-linearly over a predefined target frequency range. In general the Fourier feature positional encoding may be an encoding that maps input coordinates in one or more dimensions to Fourier coefficients of a Fourier series with frequencies ("bands") that are spaced log-linearly (linearly on a log scale) over the predefined target frequency range. In some other implementations a positional encoding may be fixed or learned. Positional embeddings of units are described in more detail below with reference to FIG. 5A and FIG. 5B.

After obtaining the feature embeddings and the positional embeddings, the system can generate, for each unit in the entity, a corresponding data element embedding by, e.g., concatenating the feature embedding of the unit and the positional embedding of the unit. In some other implementations the corresponding data element embedding may be generated by adding feature embedding of the unit and the positional embedding of the unit.

The system obtains a set of latent embeddings (404). In some implementations, a number of latent embeddings in the set of latent embeddings can be less than a number of data element embeddings in the set of data element embeddings. In some implementations, a number of latent embeddings in the set of latent embeddings can be predefined and independent of a number of data element embeddings in the set of data element embeddings.

The system processes: (i) the set of data element embeddings, and (ii) the set of latent embeddings, using the neural network to generate the network output characterizing the entity (406).

The system can include a sequence of neural network blocks having: (i) one or more cross-attention blocks, (ii) one or more self-attention blocks, and (iii) an output block. For example, the system can include multiple cross-attention blocks and multiple self-attention blocks, where the cross-attention blocks and the self-attention blocks are interleaved.

The sequence of neural network blocks can further include one or more selection blocks, and each selection block can be configured to select a proper subset (i.e. a subset of a set that does not include the set itself) of data element embeddings from the full set of data element embeddings. For example, after the set of latent embeddings are updated using one or more cross-attention blocks, one or more self-attention blocks, or both, the selection block can process the set of latent embeddings and the set of data element embeddings to generate a respective selection score for each data element embedding. Based on the selection scores, the selection block can select the proper subset of the set of data element embeddings (e.g., a predefined number of the data element embeddings having the highest selection scores) for use by one or more specified cross-attention blocks. Each specified cross-attention block can update each latent embedding in the set of latent embeddings using cross-attention over only data element embeddings in the selected proper subset of the set of data element embeddings instead of, e.g., the full set of data element embeddings.

Each selection block can include: (i) a parameter selection neural network, and (ii) a unit selection neural network. For each selection block, processing the set of latent embeddings and the set of data element embeddings to generate the respective selection score for each data element embedding in the set of data element embeddings can include: processing the latent embeddings using the parameter selection neural network to generate a network output that defines values of a set of neural network parameters of the unit selection neural network, and processing each data element embedding in the set of data element embeddings using the unit selection neural network and in accordance with the values of the set of neural network parameters of the unit selection neural network to generate the selection score for the data element embedding.

In some implementations, the system can determine a task performance measure (e.g., a cross-entropy classification error) based on the network output characterizing the entity, determine a reward based on the task performance measure, and train the selection blocks on a reinforcement learning objective function (e.g., a squared Bellman error) that depends on the reward.

Each cross-attention block can update each latent embedding in the set of latent embeddings using attention over some or all of the data element embeddings in the set of data element embeddings. This can include, e.g., updating each latent embedding in the set of latent embeddings using query-key-value attention over some or all of the data element embeddings in the set of data element embeddings, including: generating a respective query embedding for each latent embedding in the set of latent embeddings, generating a respective key embedding and a respective value embedding for each of multiple data element embeddings in the set of data element embeddings, and updating each latent embedding in the set of latent embeddings using query-key-value attention over multiple data element embeddings in the set of data element embeddings based on: (i) the query embeddings for the latent embeddings, and (ii) the key and value embeddings for the data element embeddings.

Each self-attention block can update (e.g., repeatedly) each latent embedding in the set of latent embeddings using attention over the set of latent embeddings. This can include, e.g., updating each latent embedding in the set of latent embeddings using query-key-value attention over the set of latent embeddings.

After the set of latent embeddings are updated using the one or more cross-attention blocks and the one or more self-attention blocks, the output block can process one or more latent embeddings from the set of latent embeddings to generate the network output characterizing the entity. This can include pooling, e.g., averaging, the latent embeddings in the set of latent embeddings to generate a pooled latent embedding, and processing the pooled latent embedding using one or more neural network layers to generate the network output characterizing the entity.

In some implementations, the network output can include a sequence of output elements. In such cases, processing, by the output block, one or more latent embeddings from the set of latent embeddings to generate the network output characterizing the entity can include, at each of a multiple time steps: processing: (i) the one or more latent embeddings from the set of latent embeddings, and (ii) output elements generated at any preceding time steps, to generate an output element at the time step.

Example entities and units will be described in more detail next.

Figure 5A:
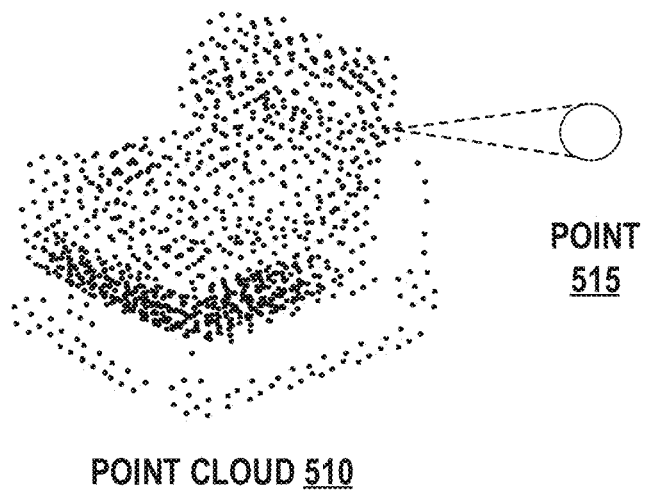
FIG. 5A illustrates an example of entities and units that can be characterized by a neural network system.
Figure 5A:
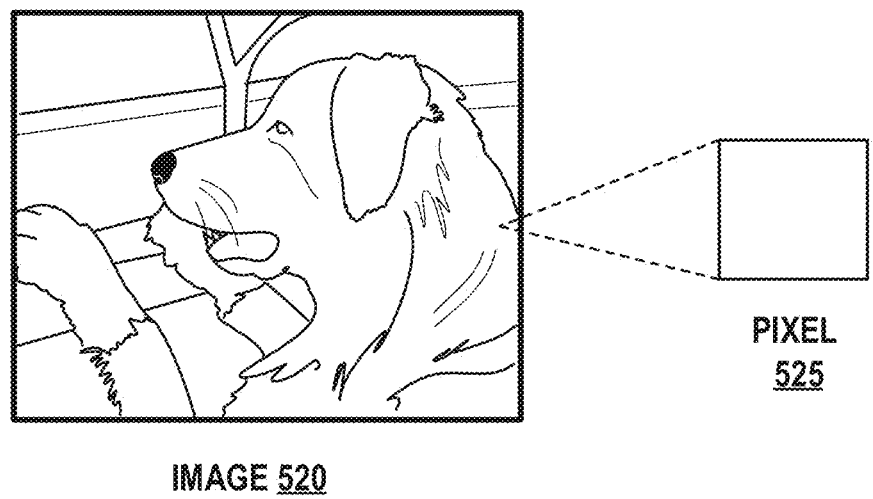

FIG. 5A illustrates an example of entities and units 500 that can be characterized by a neural network system (e.g., the system 100 in FIG. 1 or the system 200 in FIG. 2). Although only two types of entities are illustrated in FIG. 5A, the neural network system can be used to characterize an entity of any appropriate type or modality.

As described above, the neural network can obtain a representation of the entity as a set of data element embeddings and process it (e.g., together with latent embeddings) to generate a network output characterizing the entity. The entity can include multiple units arranged in a spatial structure, and each unit in the entity can be associated with positional data that defines a respective position of the unit in the spatial structure. The spatial structure can be, e.g., a one-dimensional (1D), two-dimensional (2D), or three-dimensional (3D) array of units.

As illustrated in FIG. 5A, in one example, the entity can include an image 520 and each pixel 525 in the image 520 can define a respective unit in the entity, e.g., the pixels 525 in the image 520 can be arranged as a two-dimensional array of units. In another example, the entity can include a point cloud 510 and each point 515 in the point cloud 510 can define a respective unit in the entity, e.g., the points 515 in the point cloud 510 can be arranged as a three-dimensional array of units. The pixels 525 and points 515 can be associated with positional data (e.g., coordinates defining a position of each of the pixels 525 and point clouds 515 in the respective spatial structure).

In some implementations, the neural network system can associate position and modality-specific features with each unit 515, 525 in the entity 510, 520. For example, for each unit in the entity, the neural network system can generate a feature embedding of the unit based on its features, and a positional embedding of the unit based on its position in the spatial structure. In some implementations, the system can generate the position embedding by generating a Fourier feature positional encoding having frequency bands that are spaced log-linearly over a predefined target frequency range. For example, the Fourier encoding can be generated as follows:

$$[\sin(f_k \pi x_d), \cos(f_k \pi x_d)] \qquad (2)$$

where the frequency $f_k$ is the $k^{th}$ band of a bank of frequencies spaced equally between 1 and $$\frac{\mu}{2},$$

where $$\frac{\mu}{2}$$

can be, e.g., the Nyquist frequency corresponding to a target sampling rate of $\mu$, $x_d$ is the value of the unit along the $d^{th}$ dimension in the entity (e.g., for images d=2, and for video d=3). In particular, $x_d$ can have values [−1, 1] for each dimension in the entity. In some implementations, the system can concatenate the raw position value $x_d$ to produce the final representation of position, resulting in a position encoding of size d(2K+1). For each unit in the entity, the neural network system can accordingly generate a corresponding data element embedding of the unit based on the feature embedding and the positional embedding by, e.g., concatenating the feature embedding and the positional embedding.

As described above with reference to FIG. 1 and FIG. 2, the neural network system can process the data element embeddings representing the entity and latent embeddings using attention operations. The attention operations do not require assuming that the data element embeddings are associated with a fixed spatial arrangement. For example, the attention operations do not rely on assuming that the data element embeddings are associated with a spatial arrangement into, e.g., a two-dimensional array of image pixels 525. Rather, the neural network system can flexibly incorporate information regarding the spatial arrangement of the data element embeddings by tagging (e.g., concatenating) positional encodings to the data element embeddings, and allowing the attention operations to learn to draw on this information, when relevant to generating accurate network outputs. Therefore, the neural network system can be used to process sets of data element embeddings that are not associated with a predefined spatial arrangement, e.g., sets of data elements representing point clouds 510 or images 520, thereby making the system more broadly applicable.

Figure 5B:
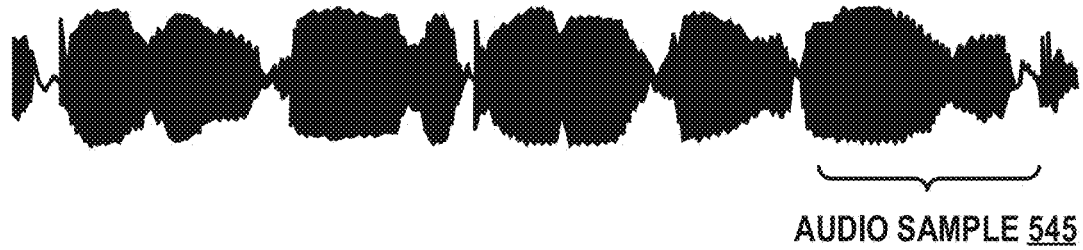
FIG. 5B illustrates another example of entities and units that can be characterized by a neural network system.
Figure 5B:
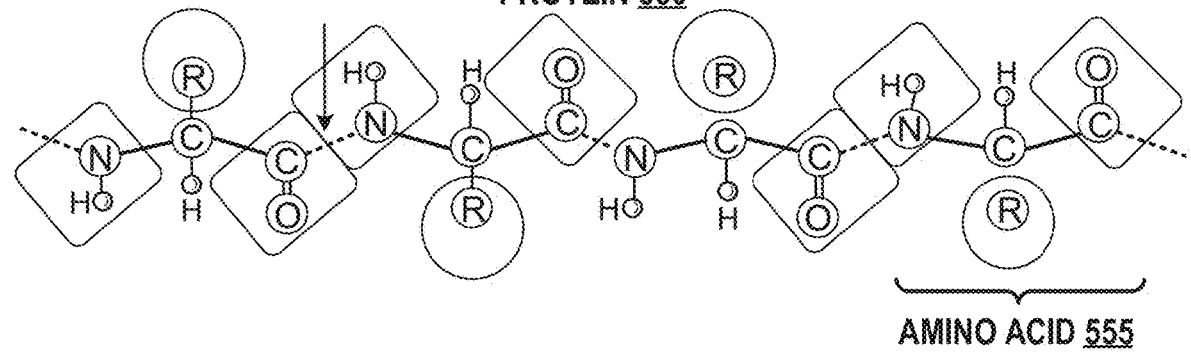

FIG. 5B illustrates another example of entities and units 500 that can be characterized by a neural network system (e.g., the system 100 in FIG. 1 or the system 200 in FIG. 2). Although only three types of entities are illustrated in FIG. 5B, the neural network system can be used to characterize an entity of any appropriate type, e.g., of any appropriate modality.

As illustrated in FIG. 5B, in one example, the entity can include a sequence of words 530, and each word 535 in the sequence of words 530 can define a respective unit in the entity. In another example, the entity can include an audio waveform 550, and each audio sample 545 in the audio waveform 540 defines a respective unit in the entity. In yet another example, the entity can include a protein 550 and each amino acid 555 in an amino acid sequence of the protein 550 can define a respective unit in the entity. In some implementations, the entity can include a mixture of different modalities. For example, the entity can include a video that includes the image 520 illustrated in FIG. 5A, and the audio waveform 540 illustrated in FIG. 5B.

Implementations of the systems described herein can process multimodal data of a multimodal entity. That is, as previously described, the characterized entity can include may comprise a combination of different types of data, such as image or video data and audio data, image or video data and language data, somatosensory input data (sensor data sensing the real-world environment of a physical agent, such as sensing touch, pressure, movement, temperature or vibration data) and motor feedback data (i.e. control data to control movement of the physical agent). With multimodal data each type, or domain, of data can use a different positional embedding. In particular each different positional embedding can have the correct dimensionality for the type of data e.g. 3d for video or point cloud data, 2D for image data, and 1D for audio data. The positional embedding may be a Fourier feature positional embedding, or a fixed or learned positional embedding. With multimodal data each type, or domain, of data may also be associated with one or more modality-specific features i.e. embeddings. These may be fixed or learned, and because they are modality-specific can be used by the system to identify the modality. Thus the units of the multimodal entity may be tagged with both positional and modality-specific features (embeddings).

When a multimodal entity is processed by the system the units or data elements of the different modalities may be combined. More specifically the data element embeddings for the different modalities may be combined, e.g. by fusing byte arrays for the different modalities into a combined byte array with the same number of channels for each modality, e.g. by concatenating a learned, modality-specific encoding to each data element embedding. In some implementations the modality-specific encoding may be combined with the positional encoding.

The network output for the multimodal entity may be as previously described. For example where the network output is a classification output for a classification task (e.g. defining a score for each category of a set of possible categories), this may be unchanged from that previously described except that the network output is generated based upon the multimodal data embeddings provided as the input. Thus the machine learning task, e.g. classification, performed by the system may be performed better, e.g. more accurately, as a result. For example a classification task may be performed on a combination of video and (corresponding) audio data to obtain a more accurate classification result. As another example the machine learning task may be one that is based upon processing data of different modalities, e.g. in a task that combines video or image data and language data e.g. text data, to determine whether an image or video is described by a particular caption.

Figure 6A:
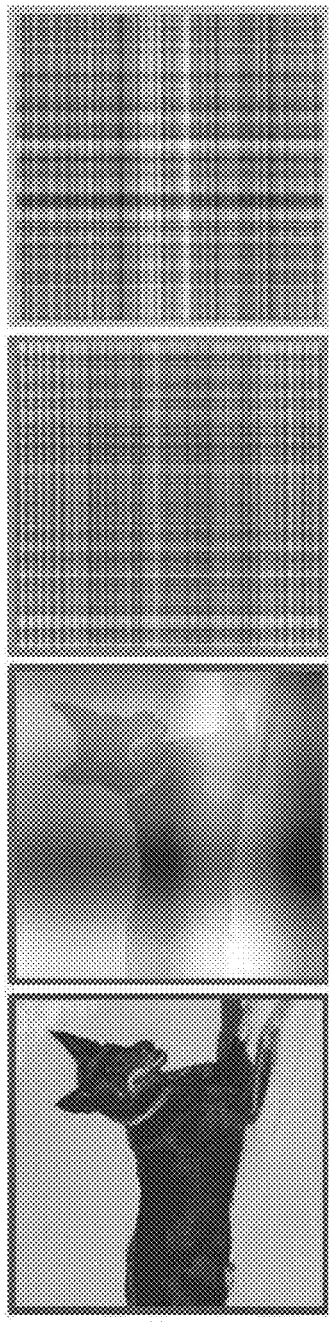
FIG. 6A illustrates example attention maps generated by a neural network system that can characterize an entity.

FIG. 6A illustrates example attention maps 600 generated by a neural network system that can characterize an entity (e.g., the system 100 in FIG. 1 or the system 200 in FIG. 2). In this example, the neural network system includes eight cross-attention blocks.

The first image on the left is an original image (e.g., an entity) that is characterized by the neural network system. The second image is an attention map generated by a first cross-attention block of the neural network system. The third image is an attention map generated by a second cross-attention block of the neural network system. The last image is an attention map generated by an eighth cross-attention block of the neural network system.

Figure 6B:
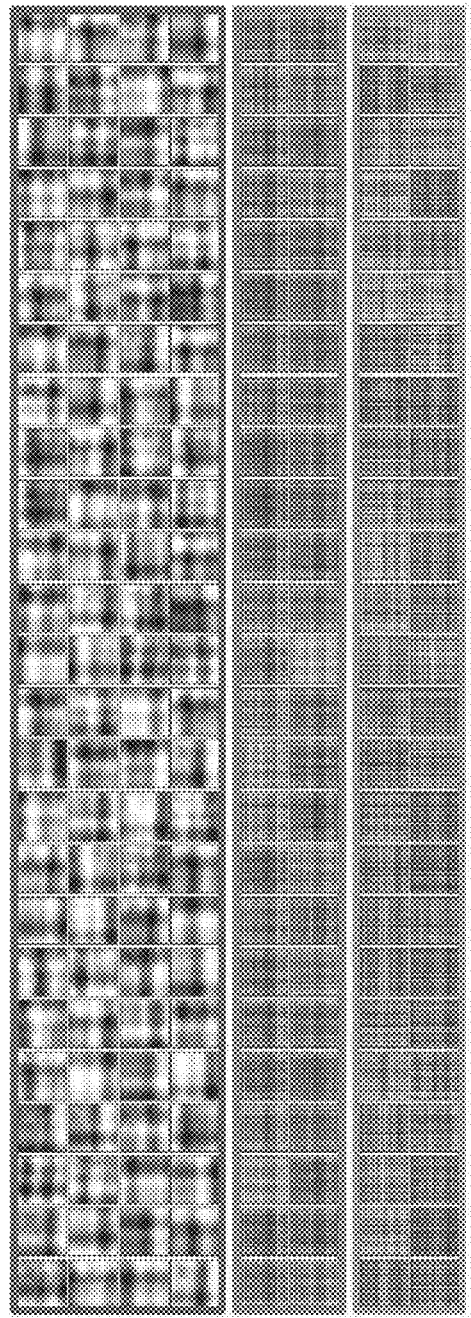
FIG. 6B illustrates another example of attention maps generated by a neural network system that can characterize an entity.

FIG. 6B illustrates example attention maps 600 generated by a neural network system that can characterize an entity (e.g., the system 100 in FIG. 1 or the system 200 in FIG. 2). In this example, the entity being characterized is the first image in FIG. 6A and the neural network system similarly includes eight cross-attention blocks.

The top panel is an overview of attention maps generated by a first cross-attention block of the neural network system. The middle panel is an overview of attention maps generated by a second cross-attention block of the neural network system. The bottom panel is an overview of attention maps generated by an eighth cross-attention block of the neural network system. Attention maps can scan the input image using tartan-like patterns at a range of spatial frequencies.

FIG. 7 illustrates an example performance of different configurations of a neural network system that can characterize an entity 700 (e.g., the system 100 in FIG. 1 or the system 200 in FIG. 2).

Specifically, FIG. 7 illustrates the performance of the neural network system as a function of the number of cross-attends and the respective arrangement of the cross-attention blocks with respect to the other neural network blocks in the neural network system.

In "interleaved," cross-attention layers are spaced throughout the network (for re-entrant processing), while in "at start" all cross-attends are placed at the start of the network followed by all latent self-attend layers. All cross-attention layers except the initial one are shared, and self-attends are also shared (e.g., using 8 blocks of 6 self-attention modules). Results are top-1 validation accuracy (in %) on ImageNet (higher is better).

Figure 8A:
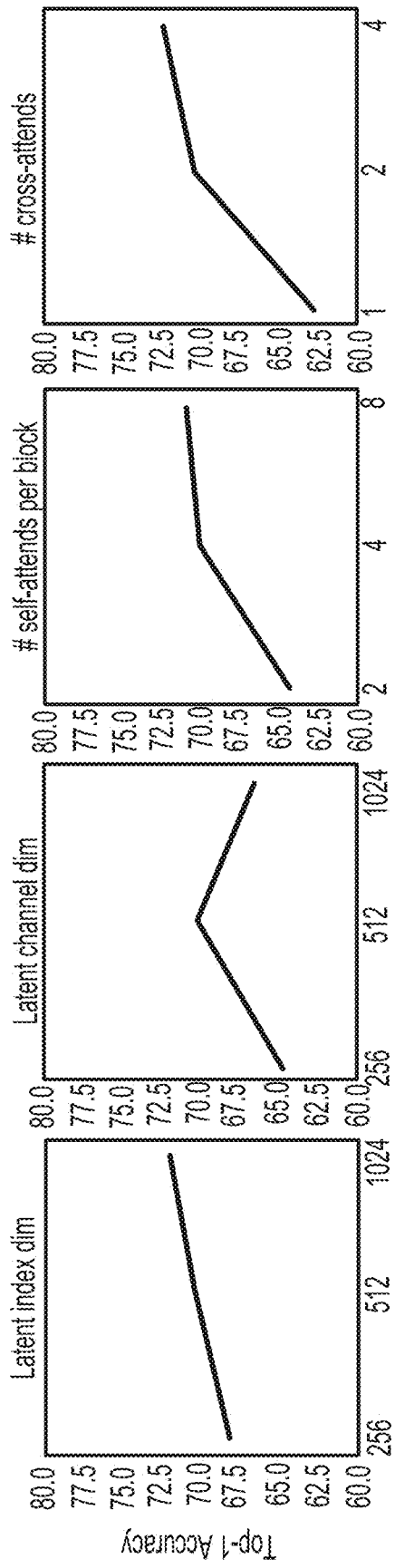
FIG. 8A illustrates example parameters of a neural network system that can characterize an entity.

FIG. 8A illustrates example parameters of a neural network system that can characterize an entity 800 (e.g., the system 100 in FIG. 1 or the system 200 in FIG. 2). All plots show top-1 accuracy (higher is better).

Specifically, FIG. 8A illustrates the effect of model hyperparameters on a performance of the neural network system. Increasing the number of latent embeddings, the number of self-attends per block, and the number of cross-attends generally improve the performance of the neural network system. In some cases, increasing the number of channels of each latent embedding can also improve the performance of the neural network system.

Figure 8B:
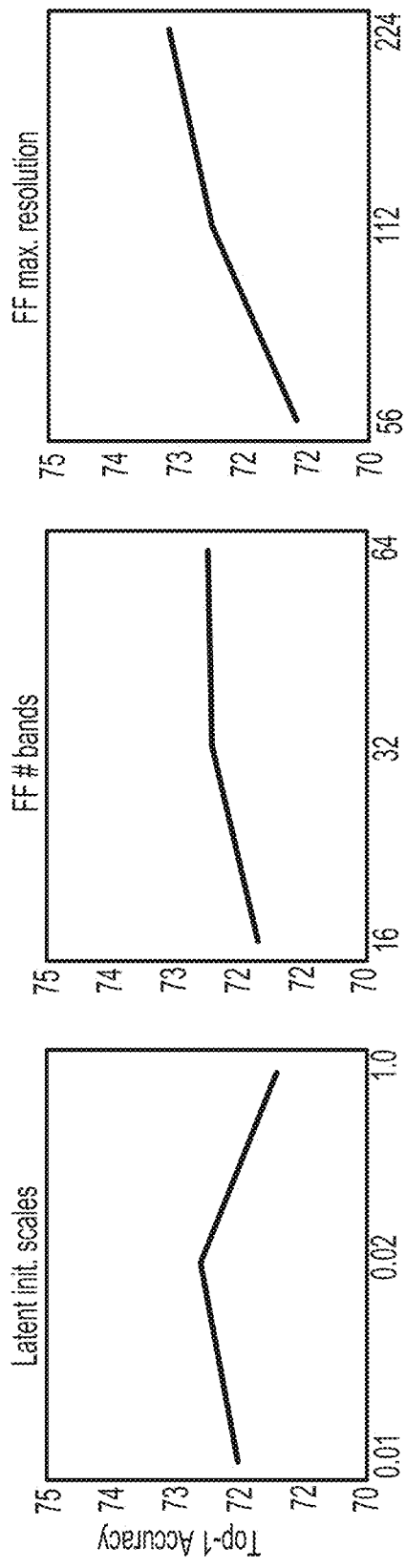
FIG. 8B illustrates another example of parameters of a neural network system that can characterize an entity.

FIG. 8B illustrates another example of parameters of a neural network system that can characterize an entity 800 (e.g., the system 100 in FIG. 1 or the system 200 in FIG. 2). All plots show top-1 accuracy (higher is better).

Specifically, FIG. 8B illustrates the effect of latent embedding initialization scale and Fourier feature position encoding parameters on a performance of the neural network system. Generally, increasing the number of bands and maximum resolution (up to Nyquist) increased the performance. In some cases, the same effects can be observed whether using linearly or logarithmically spaced position encoding bands.

FIG. 9 illustrates experimental results achieved using the neural network system described in this specification. In particular, table 910 shows top-1 validation accuracy (in %) of the neural network system described in this specification (e.g., "Perceiver") and alternative neural network systems. It can be appreciated that the neural network system described in this specification significantly outperforms the alternative systems without relying on domain-specific architectural assumptions. Table 920 also shows top-1 validation accuracy. It will be appreciated that the neural network system described in this specification significantly outperforms alternative systems while using either of the learned positional encodings or the Fourier features.

FIG. 10 illustrates experimental results achieved using the neural network system described in this specification. In particular, table 1010 shows top-1 classification accuracy (in %) of the neural network system described in this specification (e.g., "Perceiver") and alternative neural network systems. Table 1020 shows the performance of the neural network system described in this specification on video and audio-only experiments. It will be appreciated that the neural network system described in this specification significantly outperforms most alternative neural network systems.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers, the method comprising:
    generating a representation of an entity as a set of data element embeddings;
    obtaining a set of latent embeddings; and
    processing: (i) the set of data element embeddings, and (ii) the set of latent embeddings, using a neural network to generate the network output characterizing the entity,
    wherein the neural network comprises a sequence of neural network blocks comprising:
(i) one or more cross-attention blocks, (ii) one or more self-attention blocks, (iii) one or more selection blocks, and (iv) an output block,
    wherein each cross-attention block performs operations comprising:
        updating each latent embedding in the set of latent embeddings using attention over some or all of the data element embeddings in the set of data element embeddings;
    wherein each self-attention block performs operations comprising:
        updating each latent embedding in the set of latent embeddings using attention over the set of latent embeddings;
    wherein each selection block performs operations comprising:
        after the set of latent embeddings are updated using one or more cross-attention blocks, one or more self-attention blocks, or both, processing the set of latent embeddings and the set of data element embeddings to generate a respective selection score for each data element embedding in the set of data element embeddings; and
        selecting a proper subset of the set of data element embeddings for use by one or more specified cross-attention blocks based on the selection scores;
    wherein each specified cross-attention block updates each latent embedding in the set of latent embeddings using query-key-value attention over only data element embeddings in the selected proper subset of the set of data element embeddings, wherein:
        the query embeddings of the query-key-value attention are derived from the latent embeddings, and
        the key and value embeddings of the query-key-value attention are derived from only the data element embeddings in the selected proper subset of data element embeddings; and
    wherein the output block performs operations comprising:
        after the set of latent embeddings are updated using the one or more cross-attention blocks and the one or more self-attention blocks, processing one or more latent embeddings from the set of latent embeddings to generate the network output characterizing the entity.

2. The method of claim 1, wherein a number of latent embeddings in the set of latent embeddings is less than a number of data element embeddings in the set of data element embeddings.

3. The method of claim 1, wherein the neural network comprises a plurality of cross-attention blocks and a plurality of self-attention blocks, and wherein the plurality of cross-attention blocks and the plurality of self-attention blocks are interleaved.

4. The method of claim 1, wherein processing, by the output block, one or more latent embeddings from the set of latent embeddings to generate the network output characterizing the entity comprises:
    pooling the latent embeddings in the set of latent embeddings to generate a pooled latent embedding; and
    processing the pooled latent embedding using one or more neural network layers to generate the network output characterizing the entity.

5. The method of claim 4, wherein pooling the latent embeddings in the set of latent embeddings comprises averaging the latent embeddings.

6. The method of claim 1, wherein the network output characterizing the entity comprises a sequence of output elements, and wherein processing, by the output block, one or more latent embeddings from the set of latent embeddings to generate the network output characterizing the entity comprises, at each of a plurality of time steps:
    processing: (i) the one or more latent embeddings from the set of latent embeddings, and (ii) output elements generated at any preceding time steps, to generate an output element at the time step.

7. The method of claim 1, wherein for each self-attention block, updating each latent embedding in the set of latent embeddings using attention over the set of latent embeddings comprises:
    updating each latent embedding in the set of latent embeddings using query-key-value attention over the set of latent embeddings.

8. The method of claim 1, wherein each self-attention block performs operations comprising:
    repeatedly updating each latent embedding in the set of latent embeddings using attention over the set of latent embeddings.

9. The method of claim 1, wherein for each cross-attention block, updating each latent embedding in the set of latent embeddings using attention over some or all of the data element embeddings in the set of data element embeddings comprises:
    updating each latent embedding in the set of latent embeddings using query-key-value attention over some or all of the data element embeddings in the set of data element embeddings, comprising:
        generating a respective query embedding for each latent embedding in the set of latent embeddings;

generating a respective key embedding and a respective value embedding for each of a plurality of data element embeddings in the set of data element embeddings; and updating each latent embedding in the set of latent embeddings using query-key-value attention over the plurality of data element embeddings in the set of data element embeddings based on: (i) the query embeddings for the latent embeddings, and (ii) the key and value embeddings for the data element embeddings.

10. The method of claim 1, wherein, for each of one or more data modalities included within the entity, the entity comprises a respective plurality of units for the data modality arranged in a structure for the data modality, wherein each unit for the data modality is associated with positional data that defines a respective spatial or temporal position of the unit in the structure for the data modality, and wherein generating the set of data element embeddings comprises, for each of the plurality of units included in the entity:

generating the feature embedding of the unit based on features of the unit; and generating the positional embedding of the unit based on the spatial or temporal position of the unit in the structure for the data modality of the unit; and generating, for each unit in the entity, a data element embedding of the unit based on: (i) the feature embedding of the unit, and (ii) the positional embedding of the unit.

11. The method of claim 10, wherein for each unit in the entity, generating the data element embedding of the unit as a combination of: (i) the feature embedding of the unit and (ii) the positional embedding of the unit characterizing the spatial or temporal position of the unit comprises:

concatenating the feature embedding of the unit and the positional embedding of the unit.

12. The method of claim 10, wherein the structure is a one-dimensional (1D), two-dimensional (2D), or three-dimensional (3D) array of units.

13. The method of claim 1, wherein each selection block comprises: (i) a parameter selection neural network, and (ii) a unit selection neural network, and wherein for each selection block, processing the set of latent embeddings and the set of data element embeddings to generate the respective selection score for each data element embedding in the set of data element embeddings comprises:

processing the latent embeddings using the parameter selection neural network to generate a network output that defines values of a set of neural network parameters of the unit selection neural network; and processing each data element embedding in the set of data element embeddings using the unit selection neural network and in accordance with the values of the set of neural network parameters of the unit selection neural network to generate the selection score for the data element embedding.

14. The method of claim 13, wherein the task performance measure comprises a cross-entropy classification error.

15. One or more non-transitory computer storage media storing instructions that when executed by one or more computers cause the one or more computers to perform operations comprising:

generating a representation of an entity as a set of data element embeddings; wherein:

obtaining a set of latent embeddings; and processing: (i) the set of data element embeddings, and (ii) the set of latent embeddings, using a neural network to generate the network output characterizing the entity, wherein the neural network comprises a sequence of neural network blocks comprising:

(i) one or more cross-attention blocks, (ii) one or more self-attention blocks, (iii) one or more selection blocks, and (ivi) an output block, wherein each cross-attention block performs operations comprising:

updating each latent embedding in the set of latent embeddings using attention over some or all of the data element embeddings in the set of data element embeddings;

wherein each self-attention block performs operations comprising:

updating each latent embedding in the set of latent embeddings using attention over the set of latent embeddings;

wherein each selection block performs operations comprising:

after the set of latent embeddings are updated using one or more cross-attention blocks, one or more self-attention blocks, or both, processing the set of latent embeddings and the set of data element embeddings to generate a respective selection score for each data element embedding in the set of data element embeddings; and selecting a proper subset of the set of data element embeddings for use by one or more specified cross-attention blocks based on the selection scores;

wherein each specified cross-attention block updates each latent embedding in the set of latent embeddings using query-key-value attention over only data element embeddings in the selected proper subset of the set of data element embeddings, wherein:

the query embeddings of the query-key-value attention are derived from the latent embeddings, and the key and value embeddings of the query-key-value attention are derived from only the data element embeddings in the selected proper subset of data element embeddings; and wherein the output block performs operations comprising:

after the set of latent embeddings are updated using the one or more cross-attention blocks and the one or more self-attention blocks, processing one or more latent embeddings from the set of latent embeddings to generate the network output characterizing the entity.

16. The method of claim 1, wherein selecting a proper subset of the data element embeddings for use by one or more specified cross-attention blocks based on the selection scores comprises: selecting a predefined number of the data element embeddings having the highest selection scores in the set of data element embeddings.

17. The method of claim 1, further comprising: determining a task performance measure based on the network output characterizing the entity; determining a reward based on the task performance measure; and training the selection blocks on a reinforcement learning objective function that depends on the reward.

18. A system comprising:

one or more computers; and one or more storage devices communicatively coupled to the one or more computers, wherein the one or more storage devices store instructions that, when executed by the one or more computers, cause the one or more computers to perform operations comprising:

generating a representation of an entity as a set of data element embeddings;

obtaining a set of latent embeddings; and processing: (i) the set of data element embeddings, and (ii) the set of latent embeddings, using a neural network to generate the network output characterizing the multi modal entity, wherein the neural network comprises a sequence of neural network blocks comprising: (i) one or more cross-attention blocks, (ii) one or more self-attention blocks, (iii) one or more selection blocks, and (ivi) an output block, wherein each cross-attention block performs operations comprising:
  updating each latent embedding in the set of latent embeddings using attention over some or all of the data element embeddings in the set of data element embeddings;

wherein each self-attention block performs operations comprising:
  updating each latent embedding in the set of latent embeddings using attention over the set of latent embeddings;

wherein each selection block performs operations comprising:
  after the set of latent embeddings are updated using one or more cross-attention blocks, one or more self-attention blocks, or both, processing the set of latent embeddings and the set of data element embeddings to generate a respective selection score for each data element embedding in the set of data element embeddings; and
  selecting a proper subset of the set of data element embeddings for use by one or more specified cross-attention blocks based on the selection scores;

wherein each specified cross-attention block updates each latent embedding in the set of latent embeddings using query-key-value attention over only data element embeddings in the selected proper subset of the set of data element embeddings, wherein:
  the query embeddings of the query-key-value attention are derived from the latent embeddings, and
  the key and value embeddings of the query-key-value attention are derived from only the data element embeddings in the selected proper subset of data element embeddings; and wherein the output block performs operations comprising:
  after the set of latent embeddings are updated using the one or more cross-attention blocks and the one or more self-attention blocks, processing one or more latent embeddings from the set of latent embeddings to generate the network output characterizing the multi modal entity.

19. The method of claim 1, wherein a number of latent embeddings in the set of latent embeddings is: (i) predefined, (ii) independent of a number of data element embeddings in the set of data element embeddings, and (iii) fixed throughout processing of the set of latent embeddings using the neural network.

20. The method of claim 1, wherein:
the entity comprises data of at least two data modalities from a group consisting of: text data, image data, video data, audio data, point cloud data, and protein data; and
generating the representation of the entity as a set of data element embeddings comprises, for each of a plurality of units included in the entity, generating a data element embedding for the unit as a combination of: (i) a feature embedding of the unit, (ii) a positional embedding characterizing a spatial or temporal position of the unit, and (iii) a modality embedding identifying a data modality of the unit.

* * * * *